United States Patent
Zalewski et al.

(10) Patent No.: US 7,918,733 B2
(45) Date of Patent: Apr. 5, 2011

(54) MULTI-INPUT GAME CONTROL MIXER

(75) Inventors: Gary M. Zalewski, Oakland, CA (US); Richard L. Marks, Foster City, CA (US); Xiadong Mao, Foster City, CA (US)

(73) Assignee: Sony Computer Entertainment America Inc., Foster City, CA (US)

( * ) Notice: Subject to any disclaimer, the term of this patent is extended or adjusted under 35 U.S.C. 154(b) by 498 days.

(21) Appl. No.: 11/382,031

(22) Filed: May 6, 2006

(65) Prior Publication Data

US 2006/0264258 A1 Nov. 23, 2006

Related U.S. Application Data

(63) Continuation-in-part of application No. 11/381,729, filed on May 4, 2006, and a continuation-in-part of application No. 11/381,728, filed on May 4, 2006, now Pat. No. 7,545,926, and a continuation-in-part of application No. 11/381,725, filed on May 4, 2006, now Pat. No. 7,783,061, and a continuation-in-part of application No. 11/381,727, filed on May 4, 2006, now Pat. No. 7,697,700, and a continuation-in-part of application No. 11/381,724, filed on May 4, 2006, and a continuation-in-part of application No. 11/381,721, filed on May 4, 2006, and a continuation-in-part of application No. 11/301,673, filed on Dec. 12, 2005, now Pat. No. 7,646,372, and a continuation-in-part of application No. 10/820,469, filed on Apr. 7, 2004, and a continuation-in-part of application No. 10/759,782, filed on Jan. 16, 2004, now Pat. No. 7,623,115, and a continuation-in-part of application No. 10/663,236, filed on Sep. 15, 2003, and a continuation-in-part of application No. 10/650,409, filed on Aug. 27, 2003, now Pat. No. 7,613,310, and a continuation-in-part of application No. 10/207,677, filed on Jul. 27, 2002, now Pat. No. 7,102,615.

(60) Provisional application No. 60/718,145, filed on Sep. 15, 2005.

(51) Int. Cl.
*A63F 9/24* (2006.01)

(52) U.S. Cl. ............... 463/39; 463/36; 463/37; 463/38; 725/133; 725/141

(58) Field of Classification Search .............. 463/36–39; 725/133, 141
See application file for complete search history.

(56) References Cited

U.S. PATENT DOCUMENTS 4,469,330 A  9/1984  Asher
(Continued)

FOREIGN PATENT DOCUMENTS

EP  0353200 A2  1/1990
(Continued)

OTHER PUBLICATIONS

U.S. Appl. No. 11/301,673, entitled "Methods and Systems for Enabling Direction Detection When Interfacing With a Computer Program", to Richard Marks, filed Dec. 12, 2005.

(Continued)

*Primary Examiner* — John M Hotaling
*Assistant Examiner* — Marcus D Jones
(74) *Attorney, Agent, or Firm* — JDI Patent; Joshua D. Isenberg

(57) ABSTRACT

Systems, methods and for analyzing game control input data are disclosed. A machine-readable medium having embodied thereon instructions for analyzing game control input data is also disclosed.

14 Claims, 5 Drawing Sheets

U.S. PATENT DOCUMENTS

| | | | |
|---|---|---|---|
| 4,739,128 A | 4/1988 | Grisham | |
| 4,963,858 A | 10/1990 | Chien | |
| 4,977,404 A | 12/1990 | Durst et al. | |
| 5,046,739 A | 9/1991 | Reichow | |
| 5,128,671 A | 7/1992 | Thomas, Jr. | 341/20 |
| 5,195,179 A | 3/1993 | Tokunaga | |
| 5,214,615 A * | 5/1993 | Bauer | 367/128 |
| 5,227,985 A * | 7/1993 | DeMenthon | 702/153 |
| 5,262,777 A | 11/1993 | Low et al. | 341/20 |
| 5,296,871 A | 3/1994 | Paley | 345/163 |
| D345,994 S | 4/1994 | Shian | |
| 5,335,011 A | 8/1994 | Addeo et al. | 348/15 |
| 5,394,168 A | 2/1995 | Smith, III et al. | 345/156 |
| 5,412,619 A * | 5/1995 | Bauer | 367/128 |
| 5,453,758 A * | 9/1995 | Sato | 345/158 |
| 5,485,273 A | 1/1996 | Mark et al. | 356/467 |
| 5,534,917 A | 7/1996 | MacDougall | 348/169 |
| 5,554,980 A * | 9/1996 | Hashimoto et al. | 340/825.72 |
| 5,563,988 A | 10/1996 | Maes et al. | 345/421 |
| 5,611,731 A | 3/1997 | Bouton et al. | 463/37 |
| D380,238 S | 6/1997 | Tyler | |
| 5,643,087 A | 7/1997 | Marcus et al. | |
| 5,649,021 A | 7/1997 | Matey et al. | 382/128 |
| 5,659,335 A | 8/1997 | Partridge | |
| 5,724,106 A | 3/1998 | Autry et al. | |
| 5,768,415 A | 6/1998 | Jagadish et al. | 382/154 |
| 5,850,222 A | 12/1998 | Cone | 345/418 |
| 5,900,863 A | 5/1999 | Numazaki | 345/158 |
| 5,903,257 A | 5/1999 | Nishiumi et al. | |
| 5,913,727 A | 6/1999 | Ahdoot | 463/39 |
| 5,917,936 A | 6/1999 | Katto | 382/154 |
| 5,930,383 A | 7/1999 | Netzer | 382/154 |
| 6,009,210 A | 12/1999 | Kang | 382/276 |
| 6,014,167 A | 1/2000 | Suito et al. | 348/169 |
| 6,022,274 A | 2/2000 | Takeda et al. | 463/44 |
| 6,057,909 A | 5/2000 | Yahav et al. | 356/5.04 |
| 6,059,660 A | 5/2000 | Takada et al. | |
| 6,061,055 A | 5/2000 | Marks | 382/276 |
| 6,069,594 A | 5/2000 | Barnes et al. | 345/7 |
| 6,075,895 A | 6/2000 | Qiao et al. | 382/218 |
| 6,100,895 A | 8/2000 | Miura et al. | 345/426 |
| 6,102,803 A | 8/2000 | Takeda et al. | |
| 6,173,059 B1 | 1/2001 | Huang et al. | 381/92 |
| 6,195,104 B1 | 2/2001 | Lyons | 345/473 |
| 6,243,491 B1 | 6/2001 | Andersson | 382/165 |
| 6,304,267 B1 | 10/2001 | Sata | 345/427 |
| 6,346,929 B1 | 2/2002 | Fukushima et al. | 345/8 |
| 6,371,849 B1 | 4/2002 | Togami | 463/4 |
| 6,392,644 B1 | 5/2002 | Miyata et al. | 345/419 |
| 6,394,897 B1 | 5/2002 | Togami | 463/4 |
| 6,400,374 B2 | 6/2002 | Lanier | 345/630 |
| 6,411,744 B1 | 6/2002 | Edwards | 382/294 |
| 6,417,836 B1 | 7/2002 | Kumar et al. | 345/156 |
| 6,441,825 B1 | 8/2002 | Peters | 345/473 |
| 6,489,946 B1 | 12/2002 | Takeda et al. | |
| 6,489,948 B1 | 12/2002 | Lau | 345/163 |
| 6,545,706 B1 | 4/2003 | Edwards et al. | 348/169 |
| 6,573,883 B1 | 6/2003 | Bartlett | 345/156 |
| 6,597,342 B1 | 7/2003 | Haruta | 345/157 |
| 6,699,123 B2 | 3/2004 | Matsuura et al. | 463/31 |
| 6,720,949 B1 | 4/2004 | Pryor et al. | 345/158 |
| 6,791,531 B1 | 9/2004 | Johnston et al. | 345/157 |
| 6,850,221 B1 | 2/2005 | Tickle | |
| 6,890,262 B2 | 5/2005 | Oishi et al. | 463/31 |
| 6,990,639 B2 | 1/2006 | Wilson | 715/863 |
| 7,042,440 B2 | 5/2006 | Pryor et al. | 345/158 |
| 7,102,615 B2 | 9/2006 | Marks | 345/156 |
| 7,168,042 B2 | 1/2007 | Braun et al. | |
| 7,182,691 B1 | 2/2007 | Schena | |
| 7,193,607 B2 | 3/2007 | Moore et al. | |
| 7,233,316 B2 | 6/2007 | Smith et al. | 345/157 |
| 7,259,375 B2 | 8/2007 | Tichit et al. | 250/341.8 |
| 7,260,221 B1 | 8/2007 | Atsmon | |
| 7,432,910 B2 | 10/2008 | Shahoian | |
| 2002/0024500 A1 | 2/2002 | Howard | 345/158 |
| 2002/0041327 A1 | 4/2002 | Hildreth et al. | 348/42 |
| 2002/0110273 A1 | 8/2002 | Dufour | 382/154 |
| 2002/0171625 A1 | 11/2002 | Rothchild | |
| 2003/0020718 A1 | 1/2003 | Marshall et al. | 345/474 |
| 2003/0022716 A1 | 1/2003 | Park et al. | 463/36 |
| 2003/0032466 A1 | 2/2003 | Watashiba | 463/2 |
| 2003/0032484 A1 | 2/2003 | Ohshima et al. | 463/43 |
| 2003/0038778 A1 | 2/2003 | Noguera | |
| 2003/0063065 A1 | 4/2003 | Lee et al. | 345/156 |
| 2003/0100363 A1 | 5/2003 | Ali | 463/30 |
| 2003/0160862 A1 | 8/2003 | Charlier et al. | 348/14.08 |
| 2003/0193572 A1 | 10/2003 | Wilson et al. | 348/207.99 |
| 2004/0029640 A1 | 2/2004 | Masuyama et al. | 463/43 |
| 2004/0046736 A1 | 3/2004 | Pryor et al. | 345/156 |
| 2004/0047464 A1 | 3/2004 | Yu et al. | 379/392.01 |
| 2004/0070564 A1 | 4/2004 | Dawson et al. | 345/156 |
| 2004/0155962 A1 | 8/2004 | Marks | 348/469 |
| 2004/0178576 A1 | 9/2004 | Hillis et al. | 273/148 |
| 2004/0207597 A1 | 10/2004 | Marks | 345/156 |
| 2004/0212589 A1 | 10/2004 | Hall et al. | |
| 2004/0213419 A1 | 10/2004 | Varma et al. | 381/92 |
| 2004/0239670 A1 | 12/2004 | Marks | 345/419 |
| 2004/0240542 A1 | 12/2004 | Yeredor et al. | 375/240.01 |
| 2005/0047611 A1 | 3/2005 | Mao | 381/94.7 |
| 2005/0059488 A1 | 3/2005 | Larsen et al. | 463/36 |
| 2005/0162384 A1 | 7/2005 | Yokoyama | |
| 2005/0174324 A1 | 8/2005 | Liberty et al. | 345/156 |
| 2005/0226431 A1 | 10/2005 | Mao | 381/61 |
| 2006/0035710 A1 | 2/2006 | Festejo et al. | 463/36 |
| 2006/0204012 A1 | 9/2006 | Marks | 328/26 |
| 2006/0233389 A1 | 10/2006 | Mao et al. | 381/92 |
| 2006/0239471 A1 | 10/2006 | Mao et al. | 381/92 |
| 2006/0252474 A1 | 11/2006 | Zalewski et al. | 463/1 |
| 2006/0252475 A1 | 11/2006 | Zalewski et al. | 463/1 |
| 2006/0252477 A1 | 11/2006 | Zalewski et al. | 463/7 |
| 2006/0252541 A1 | 11/2006 | Zalewski et al. | 463/36 |
| 2006/0252543 A1 | 11/2006 | Van Noland et al. | |
| 2006/0256081 A1 | 11/2006 | Zalewski et al. | 345/156 |
| 2006/0264258 A1 | 11/2006 | Zalewski et al. | 463/36 |
| 2006/0264259 A1 | 11/2006 | Zalewski et al. | 463/36 |
| 2006/0264260 A1 | 11/2006 | Zalewski et al. | 463/36 |
| 2006/0269072 A1 | 11/2006 | Mao | 381/56 |
| 2006/0269073 A1 | 11/2006 | Mao | 381/56 |
| 2006/0274032 A1 | 12/2006 | Mao et al. | 345/156 |
| 2006/0274911 A1 | 12/2006 | Mao et al. | 380/334 |
| 2006/0277571 A1 | 12/2006 | Marks | 725/37 |
| 2006/0280312 A1 | 12/2006 | Mao | 381/56 |
| 2006/0282873 A1 | 12/2006 | Zalewski et al. | 725/133 |
| 2006/0287084 A1 | 12/2006 | Mao et al. | 463/37 |
| 2006/0287085 A1 | 12/2006 | Mao et al. | 463/37 |
| 2006/0287086 A1 | 12/2006 | Zalewski et al. | 463/37 |
| 2006/0287087 A1 | 12/2006 | Zalewski | 463/37 |
| 2007/0015558 A1 | 1/2007 | Zalewski et al. | 463/1 |
| 2007/0015559 A1 | 1/2007 | Zalewski et al. | 463/1 |
| 2007/0021208 A1 | 1/2007 | Mao et al. | 436/36 |
| 2007/0025562 A1 | 2/2007 | Zalewski et al. | 381/92 |
| 2007/0061413 A1 | 3/2007 | Larsen | 704/247 |
| 2007/0258599 A1 | 11/2007 | Mao | 381/71.1 |
| 2007/0260340 A1 | 11/2007 | Mao | 700/94 |
| 2007/0260517 A1 | 11/2007 | Zalewski et al. | 705/14 |
| 2007/0261077 A1 | 11/2007 | Zalewski et al. | 725/35 |
| 2007/0274535 A1 | 11/2007 | Mao | 381/94.1 |
| 2009/0067291 A1 | 3/2009 | Atsmon et al. | |

FOREIGN PATENT DOCUMENTS

| | | |
|---|---|---|
| EP | 0613294 A1 | 8/1994 |
| EP | 0 652 686 | 5/1995 |
| EP | 0750202 A1 | 12/1996 |
| EP | 0823 683 A1 | 2/1998 |
| EP | 0 835 676 | 4/1998 |
| EP | 0 867 798 | 9/1998 |
| EP | 0869 458 A2 | 10/1998 |
| EP | 1 033 882 | 9/2000 |
| EP | 1 074 934 | 2/2001 |
| EP | 1180 384 A2 | 2/2002 |
| EP | 1 206 950 A2 | 5/2002 |
| EP | 1279 425 A2 | 1/2003 |
| EP | 1 306 112 A1 | 5/2003 |
| EP | 1 335 338 | 8/2003 |
| EP | 1 358 918 | 11/2003 |
| EP | 1 411 461 | 4/2004 |
| EP | 1 489 596 | 12/2004 |

| | | |
|---|---|---|
| FR | 2 780 176 | 6/1988 |
| FR | 2832 892 | 5/2003 |
| GB | 2 376 397 A | 12/2002 |
| WO | WO 88/05942 | 8/1988 |
| WO | WO 99/26198 | 5/1999 |
| WO | WO 01/18563 A1 | 3/2001 |
| WO | WO 2004/073814 | 9/2004 |
| WO | WO 2004/073815 | 9/2004 |
| WO | WO 2006/121896 | 11/2006 |

OTHER PUBLICATIONS

U.S. Appl. No. 11/381,728, entitled "Echo and Noise Cancellation", to Xiadong Mao, filed on May 4, 2006.
U.S. Appl. No. 11/381,725, entitled "Methods and Apparatus for Targeted Sound Detection", to Xiadong Mao, filed May 4, 2006.
U.S. Appl. No. 11/381,729, entitled "Ultra Small Microphone Array", to Xiadong Mao, filed May 4, 2006.
U.S. Appl. No. 11/381,727, entitled "Noise Removal for Electronic Device With Far Field Microphone on Console", to Xiadong Mao, filed May 4, 2006.
U.S. Appl. No. 11/381,724, entitled "Methods and Apparatus for Targeted Sound Detection and Characterization", to Xiadong Mao, filed May 4, 2006.
U.S. Appl. No. 11/418,988, entitled "Methods and Apparatuses for Adjusting a Listening Area for Capturing Sounds", to Xiadong Mao, filed May 4, 2006.
U.S. Appl. No. 11/418,989, entitled "Methods and Apparatuses for Capturing an Audio Signal Based on Visual Image", to Xiadong Mao, filed May 4, 2006.
U.S. Appl. No. 11/429,047, entitled "Methods and Apparatuses for Capturing an Audio Signal Based on a Location of the Signal", to Xiadong Mao, filed May 4, 2006.
U.S. Appl. No. 11/381,721, entitled "Selective Sound Source Listening in Conjunction With Computer Interactive Processing", to Xiadong Mao, filed May 4, 2006.
U.S. Appl. No. 11/429,133, entitled "Selective Sound Source Listening in Conjunction With Computer Interactive Processing", to Richard Marks et al., filed on May 4, 2006.
U.S. Appl. No. 11/429,414, entitled "Computer Image and Audio Processing of Intensity and Input Devices for Interfacing With a Computer Program", to Richard Marks et al., filed May 4, 2006.
U.S. Appl. No. 29/259,349, entitled "Controller With Infrared Port", to Teiyu Goto, filed May 6, 2006.
U.S. Appl. No. 29/259,350, entitled "Controller With Tracking Sensors", to Gary Zalewski, filed May 6, 2006.
U.S. Appl. No. 29/259,348, entitled "Tracked Controller Device", to Gary Zalewski, filed May 6, 2006.
Mark Fiala et al., "A Panoramic Video and Acoustic Beamforming Sensor for Videoconferencing", IEEE, Oct. 2-3, 2004, pp. 47-52.
Kevin W. Wilson et al., "Audio-Video Array Source Localization for Intelligent Environments", IEEE 2002, vol. 2, pp. 2109-2112.
Y. Ephraim and D. Malah, "Speech enhancement using a minimum mean-square error short-time spectral amplitude estimator," *IEEE Trans. Acoust., Speech, Signal Processing*, vol. ASSP-32, pp. 1109-1121, Dec. 1984.
Y. Ephraim and D. Malah, "Speech enhancement using a minimum mean-square error log-spectral amplitude estimator," *IEEE Trans. Acoust., Speech, Signal Processing*, vol. ASSP-33, pp. 443-445, Apr. 1985.
Klinker et al., "Distribute User Tracking Concepets for Augmented Reality Applications" pp. 37-44, Augmented Reality, 2000, IEEE and ACM Int'l Symposium, Oct. 2000, XP010520308, ISBN: 0-7695-0846-4, Germany.
Iddan et al. "3D Imaging in the Studio (and Elswhere . . . )", Proceedings of the SPIE, SPIE, Bellingham, VA, US, vol. 4298, Jan. 24, 2001, pp. 48-55, XP008005351.
Jojie et al., Tracking self-occluding Articulated Objects in Dense Disparity Maps, Computer Vision, 1999. The Proceedings of the seventh IEEE International Conference on Kerkyra, Greece Sep. 20-27, 1999, Los Alamitos, CA, USA, IEEE Comput. Soc, Us, Sep. 20, 1999, pp. 123-130.
"The Tracking Cube: A Three Dimensional Input Device", IBM Technical Disclosure Bulletin, Aug. 1, 1989, pp. 91-95, vol. 32, No. 3b, IBM Corp. new York, US.
Jaron Lanier, "Virtually There", Scientific American: New Horizons for Information Technology,2003.
Provisional U.S. Appl. No. 60/798,031, entitled "Dynamic Targt Interface", to Bruce Woodard, filed May 6, 2006.
U.S. Appl. No. 29/246,744, entitled "Video Game Controller Front Face", to Teiyu Goto, filed May 8, 2006.
U.S. Appl. No. 29/246,743, entitled "Video Game Controller", to Teiyu Goto, filed May 8, 2006.
U.S. Appl. No. 29/246,767, entitled "Video Game Controller", filed May 8, 2006.
U.S. Appl. No. 29/246,768, entitled "Video Game Controller", filed May 8, 2006.
U.S. Appl. No. 29/246,763, entitled "Ergonomic Game Controller Device With Leds and Optical Ports", filed May 8, 2006.
U.S. Appl. No. 29/246,759, entitled "Game Controller Device With Leds and Optical Ports", filed May 8, 2006.
U.S. Appl. No. 29/246,765, entitled "Designing for Optical Game Controller Interface", filed May 8, 2006.
U.S. Appl. No. 29/246,766, entitled "Dual Grip Game Control Device With Leds and Optical Ports", filed May 8, 2006.
U.S. Appl. No. 29/246,764, entitled "Game Interface Device With Leds and Optical Ports", filed May 8, 2006.
U.S. Appl. No. 29/246,762, entitled "Ergonomic Game Interface Device With Leds and Optical Ports", filed May 8, 2006.
Definition of "mount"—Merriam-Webster Online Dictionary; downloaded from the Internet <http://www. M-w.com/dictionary/mountable>, downloaded on Nov. 8, 2007.
CFS and FS95/98/2000: How to Use the Trim Controls to Keep Your Aircraft level—http://support.microsoft.com/?scid=kb%3Ben-us%3B175195&x=13&y=15, downloaded on Aug. 10, 2007.
"European Search Report" for European Application No. 07251651.1 dated Oct. 18, 2007.
International Search Report and Written Opinion for International Application No. PCT/US06/61056 dated Mar. 3, 2008.
International Search Report and Written Opinion of the International Searching Authority for International Patent Application No. PCT/US07/67004 dated Jul. 28, 2008.
Office Action dated Jul. 22, 2008 for U.S. Appl. No. 11/382,250.
Office Action dated Jul. 25, 2008 for U.S. Appl. No. 11/382,035.
Final Office Action dated May 1, 2009 for U.S. Appl. No. 11/382,250, 17 pages.
Office Action dated Jan. 22, 2010 issued for U.S. Appl. No. 11/382,250.
Notice of Allowance dated Sep. 13, 2010 issued for U.S. Appl. No. 11/382,250.
Notice of Allowance dated Sep. 2, 2010 issued for U.S. Appl. No. 11/382,032.
Notice of Preliminary Rejection dated Aug. 25, 2010 issued for Korea patent application No. 10-2008-7029704.
First Office Action dated Aug. 16, 2010 issued for China patent application No. 200780016094.
Notice of Preliminary Rejection dated Aug. 25, 2010 issued for Korea patent application No. 10-2008-7029705.
Office Action dated Sep. 25, 2009 for U.S. Appl. No. 11/382,032.
Office Action dated May 27, 2009 for U.S. Appl. No. 11/382,035.
Final Office Action dated Jan. 7, 2009 for U.S. Appl. No. 11/382,035.
Final Office Action dated May 1, 2009 for U.S. Appl. No. 11/382,250.
You S et al: "Fusion of Vision and Gyro Tracking for Roburst Augmented Reality Registration" - Proceedings IEEE 2001 Virtual Reality, Jan. 1, 2001, pp.71-78.
The extended European Search Report dated Oct. 27, 2010 issued for European patent application No. EP 07760946.9.
US 2002/0018582 A1, 02/2002, Hagiwara et al. (withdrawn)

* cited by examiner

MULTI-INPUT GAME CONTROL MIXER

CLAIM OF PRIORITY

This application is a continuation in part (CIP) of U.S. patent application Ser. No. 10/207,677, entitled, "MAN-MACHINE INTERFACE USING A DEFORMABLE DEVICE", filed on Jul. 27, 2002, now U.S. Pat. No. 7,102,615; U.S. patent application Ser. No. 10/650,409, entitled, "AUDIO INPUT SYSTEM", filed on Aug. 27, 2003, now U.S. Pat. No. 7,613,310; U.S. patent application Ser. No. 10/663,236, entitled "METHOD AND APPARATUS FOR ADJUSTING A VIEW OF A SCENE BEING DISPLAYED ACCORDING TO TRACKED HEAD MOTION", filed on Sep. 15, 2003; U.S. patent application Ser. No. 10/759,782, entitled "METHOD AND APPARATUS FOR LIGHT INPUT DEVICE", filed on Jan. 16, 2004, now U.S. Pat. No. 7,623,115; U.S. patent application Ser. No. 10/820,469, entitled "METHOD AND APPARATUS TO DETECT AND REMOVE AUDIO DISTURBANCES", filed on Apr. 7, 2004; and U.S. patent application Ser. No. 11/301,673, entitled "METHOD FOR USING RELATIVE HEAD AND HAND POSITIONS TO ENABLE A POINTING INTERFACE VIA CAMERA TRACKING", filed on Dec. 12, 2005, now U.S. Pat. No. 7,646,372, U.S. patent application Ser. No. 11/381,729, to Xiao Dong Mao, entitled ULTRA SMALL MICROPHONE ARRAY, filed on May 4, 2006, application Ser. No. 11/381,728, to Xiao Dong Mao, entitled ECHO AND NOISE CANCELLATION, filed on May 4, 2006, now U.S. Pat. No. 7,545,926, U.S. patent application Ser. No. 11/381,725, to Xiao Dong Mao, entitled "METHODS AND APPARATUS FOR TARGETED SOUND DETECTION", filed on May 4, 2006, now U.S. Pat. No. 7,783,061, U.S. patent application Ser. No. 11/381,727, to Xiao Dong Mao, entitled "NOISE REMOVAL FOR ELECTRONIC DEVICE WITH FAR FIELD MICROPHONE ON CONSOLE", filed on May 4, 2006, now U.S. Pat. No. 7,697,700, U.S. patent application Ser. No. 11/381,724, to Xiao Dong Mao, entitled "METHODS AND APPARATUS FOR TARGETED SOUND DETECTION AND CHARACTERIZATION", filed on May 4, 2006, U.S. patent application Ser. No. 11/381,721, to Xiao Dong Mao, entitled "SELECTIVE SOUND SOURCE LISTENING IN CONJUNCTION WITH COMPUTER INTERACTIVE PROCESSING", filed on May 4, 2006; all of which are hereby incorporated by reference.

This application claims benefit of U.S. Provisional Patent Application No. 60/718,145, entitled "AUDIO, VIDEO, SIMULATION, AND USER INTERFACE PARADIGMS", filed Sep. 15, 2005, which is hereby incorporated by reference.

CROSS-REFERENCE TO RELATED APPLICATIONS

This application is related to co-pending application Ser. No. 11/418,988, to Xiao Dong Mao, entitled "METHODS AND APPARATUSES FOR ADJUSTING A LISTENING AREA FOR CAPTURING SOUNDS", filed on May 4, 2006, the entire disclosures of which are incorporated herein by reference. This application is also related to co-pending application Ser. No. 11/418,989, to Xiao Dong Mao, entitled "METHODS AND APPARATUSES FOR CAPTURING AN AUDIO SIGNAL BASED ON VISUAL IMAGE", filed on May 4, 2006, the entire disclosures of which are incorporated herein by reference. This application is also related to co-pending application Ser. No. 11/429,047, to Xiao Dong Mao, entitled "METHODS AND APPARATUSES FOR CAPTURING AN AUDIO SIGNAL BASED ON A LOCATION OF THE SIGNAL", filed on May 4, 2006, the entire disclosures of which are incorporated herein by reference. This application is also related to co-pending application Ser. No. 11/429,133, to Richard Marks et al., entitled "SELECTIVE SOUND SOURCE LISTENING IN CONJUNCTION WITH COMPUTER INTERACTIVE PROCESSING", filed on May 4, 2006, the entire disclosures of which are incorporated herein by reference. This application is also related to co-pending application Ser. No. 11/429,414, to Richard Marks et al., entitled "Computer Image and Audio Processing of Intensity and Input Devices for Interfacing With A Computer Program", filed on May 4, 2006, the entire disclosures of which are incorporated herein by reference.

2. This application is also related to co-pending application Ser. No. 11/382,032, entitled "SYSTEM FOR TRACKING USER MANIPULATIONS WITHIN AN ENVIRONMENT", filed on the same day as this application, the entire disclosures of which are incorporated herein by reference.

3. This application is also related to co-pending application Ser. No. 11/382,033, entitled "SYSTEM, METHOD, AND APPARATUS FOR THREE-DIMENSIONAL INPUT CONTROL", filed on the same day as this application, the entire disclosures of which are incorporated herein by reference.

4. This application is also related to co-pending application Ser. No. 11/382,035, entitled "INERTIALLY TRACKABLE HAND-HELD CONTROLLER", filed on the same day as this application, the entire disclosures of which are incorporated herein by reference.

5. This application is also related to co-pending application Ser. No. 11/382,036, entitled "METHOD AND SYSTEM FOR APPLYING GEARING EFFECTS TO VISUAL TRACKING", filed on the same day as this application, the entire disclosures of which are incorporated herein by reference.

6. This application is also related to co-pending application Ser. No. 11/382,041, entitled "METHOD AND SYSTEM FOR APPLYING GEARING EFFECTS TO INERTIAL TRACKING", filed on the same day as this application, the entire disclosures of which are incorporated herein by reference.

7. This application is also related to co-pending application Ser. No. 11/382,038, entitled "METHOD AND SYSTEM FOR APPLYING GEARING EFFECTS TO ACOUSTICAL TRACKING", filed on the same day as this application, the entire disclosures of which are incorporated herein by reference.

8. This application is also related to co-pending application Ser. No. 11/382,040, entitled "METHOD AND SYSTEM FOR APPLYING GEARING EFFECTS TO MULTI-CHANNEL MIXED INPUT", filed on the same day as this application, the entire disclosures of which are incorporated herein by reference.

9. This application is also related to co-pending application Ser. No. 11/382,034, entitled "SCHEME FOR DETECTING AND TRACKING USER MANIPULATION OF A GAME CONTROLLER BODY", filed on the same day as this application, the entire disclosures of which are incorporated herein by reference.

10. This application is also related to co-pending application Ser. No. 11/382,037, entitled "SCHEME FOR TRANSLATING MOVEMENTS OF A HAND-HELD CONTROLLER INTO INPUTS FOR A SYSTEM", filed on the same day as this application, the entire disclosures of which are incorporated herein by reference.

11. This application is also related to co-pending application Ser. No. 11/382,043, entitled "DETECTABLE AND TRACKABLE HAND-HELD CONTROLLER", filed on the same day as this application, the entire disclosures of which are incorporated herein by reference.

12. This application is also related to co-pending application Ser. No. 11/382,039, entitled "METHOD FOR MAPPING MOVEMENTS OF A HAND-HELD CONTROLLER TO GAME COMMANDS", filed on the same day as this application, the entire disclosures of which are incorporated herein by reference.

13. This application is also related to co-pending application No. 29/259,349, entitled "CONTROLLER WITH INFRA-RED PORT ((DESIGN PATENT))", filed on the same day as this application, the entire disclosures of which are incorporated herein by reference.

14. This application is also related to co-pending application No. 29/259,350, entitled "CONTROLLER WITH TRACKING SENSORS ((DESIGN PATENT))", filed on the same day as this application, the entire disclosures of which are incorporated herein by reference.

15. This application is also related to co-pending application 60/798,031, entitled "DYNAMIC TARGET INTERFACE", filed on the same day as this application, the entire disclosures of which are incorporated herein by reference.

16. This application is also related to co-pending application Ser. No. 29/259,348, entitled "TRACKED CONTROLLER DEVICE ((DESIGN))", filed on the same day as this application, the entire disclosures of which are incorporated herein by reference.

FIELD OF THE INVENTION

The present invention generally relates to human-computer interfacing and specifically to processing multi-channel input for tracking the user manipulation of one or more controllers.

BACKGROUND OF THE INVENTION

Computer entertainment systems typically include a hand-held controller, game controller, or other controller. A user or player uses the controller to send commands or other instructions to the entertainment system to control a video game or other simulation being played. For example, the controller may be provided with a manipulator which is operated by the user, such as a joy stick. The manipulated variable of the joy stick is converted from an analog value into a digital value, which is sent to the game machine main frame. The controller may also be provided with buttons that can be operated by the user.

It is with respect to these and other background information factors that the present invention has evolved.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Figure 1:
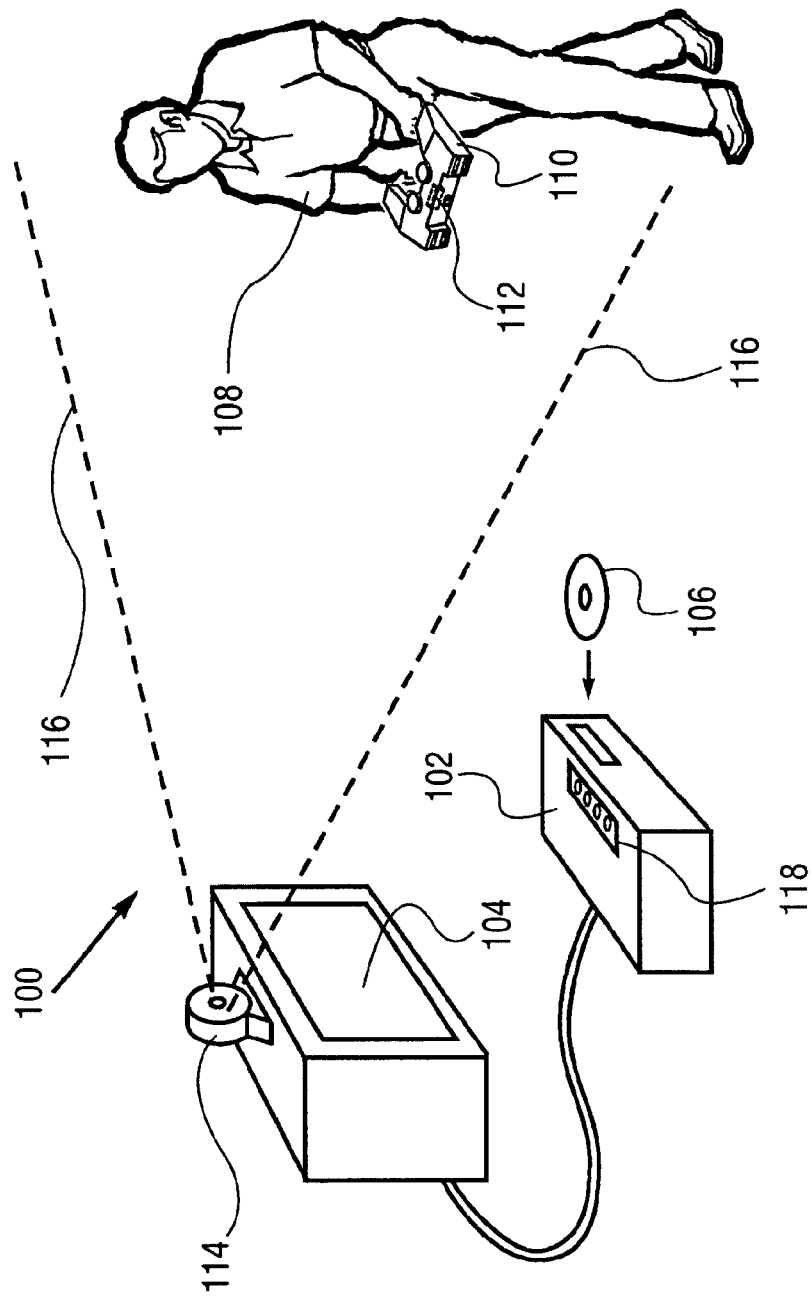
FIG. 1 is a pictorial diagram illustrating a video game system that operates in accordance with an embodiment of the present invention.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Various embodiments of the methods, apparatus, schemes and systems described herein provide for the detection, capture and tracking of the movements, motions and/or manipulations of the entire controller body itself by the user. The detected movements, motions and/or manipulations of the entire controller body by the user may be used as additional commands to control various aspects of the game or other simulation being played.

Detecting and tracking a user's manipulations of a game controller body may be implemented in different ways. For example, an inertial sensor, such as an accelerometer or gyroscope, an image capture unit, such as a digital camera, can be used with the computer entertainment system to detect motions of the hand-held controller body and transfer them into actions in a game. Examples of tracking a controller with an inertial sensor are described, e.g., in U.S. patent application Ser. No. 11/382,033, entitled "SYSTEM, METHOD, AND APPARATUS FOR THREE-DIMENSIONAL INPUT CONTROL", which is incorporated herein by reference. Examples of tracking a controller using image capture are described, e.g., in U.S. patent application Ser. No. 11/382,034, entitled "SCHEME FOR DETECTING AND TRACKING USER MANIPULATION OF A GAME CONTROLLER BODY", which is incorporated herein by reference. In addition, the controller and/or the user may also be tracked acoustically using a microphone array and appropriate signal processing. Examples of such acoustic tracking are described in U.S. patent application Ser. No. 11/381,721, which is incorporated herein by reference.

Acoustic sensing, inertial sensing and image capture can be used individually or in any combination to detect many different types of motions of the controller, such as for example up and down movements, twisting movements, side to side movements, jerking movements, wand-like motions, plunging motions, etc. Such motions may correspond to various commands such that the motions are transferred into actions in a game. Detecting and tracking the user's manipulations of a game controller body can be used to implement many different types of games, simulations, etc., that allow the user to, for example, engage in a sword or lightsaber fight, use a wand to trace the shape of items, engage in many different types of sporting events, engage in on-screen fights or other encounters, etc. A game program may be configured to track the motion of the controller and recognize certain pre-recorded gestures from the tracked motion. Recognition of one or more of these gestures may trigger a change in the game state.

In embodiments of the present invention controller path information obtained from these different sources may be mixed prior to analysis for gesture recognition. The tracking data from different sources (e.g., acoustic, inertial and image capture) may be mixed in a way that improves the likelihood of recognition of a gesture.

Figure 2:
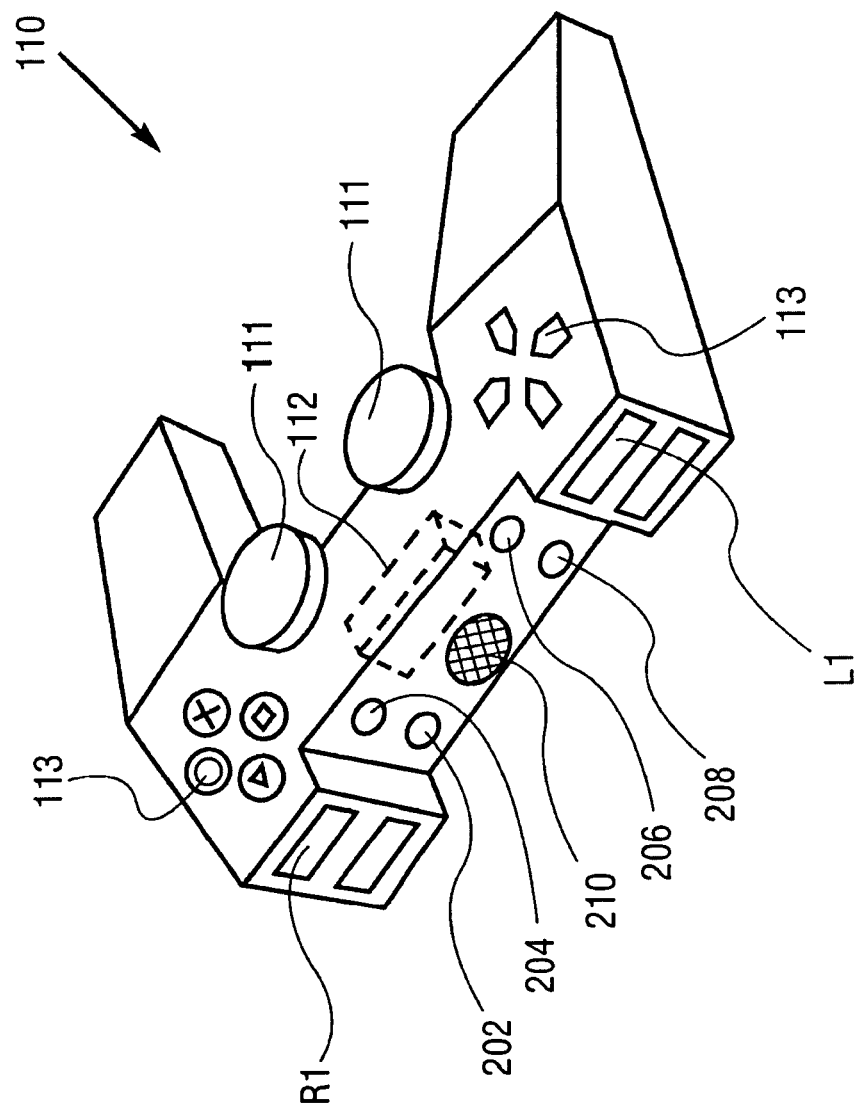
FIG. 2 is a perspective view of a controller made in accordance with an embodiment of the present invention.

Referring to FIG. 1, there is illustrated a system 100 that operates in accordance with an embodiment of the present invention. As illustrated, a computer entertainment console 102 may be coupled to a television or other video display 104 to display the images of the video game or other simulation thereon. The game or other simulation may be stored on a DVD, CD, flash memory, USB memory, or other memory media 106 that is inserted into the console 102. A user or player 108 manipulates a game controller 110 to control the video game or other simulation. As seen in FIG. 2, the game controller 110 includes an inertial sensor 112 that produces signals in response to the position, motion, orientation or change in orientation of the game controller 110. In addition to the inertial sensor, the game controller 110 may include conventional control input devices, e.g., joysticks 111, buttons 113, R1, L1, and the like.

During operation, the user 108 physically moves the controller 110. For example, the controller 110 may be moved in any direction by the user 108, such as up, down, to one side, to the other side, twisted, rolled, shaken, jerked, plunged, etc. These movements of the controller 110 itself may be detected and captured by the camera 112 by way of tracking through analysis of signals from the inertial sensor 112 in a manner described below.

Referring again to FIG. 1, the system 100 may optionally include a camera or other video image capturing device 114, which may be positioned so that the controller 110 is within the camera's field of view 116. Analysis of images from the image capturing device 114 may be used in conjunction with analysis of data from the inertial sensor 112. As shown in FIG. 2, the controller 110 may optionally be equipped with light sources such as light emitting diodes (LEDs) 202, 204, 206, 208 to facilitate tracking by video analysis. These may be mounted to a body of the controller 110. As used herein, the term "body" meant to describe the part of the game controller 110 that one would hold by hand (or wear if it were a wearable game controller).

Analysis of such video images for the purpose of tracking the controller 110 are described, e.g., in U.S. patent application Ser. No. 11/382,034, entitled "SCHEME FOR DETECTING AND TRACKING USER MANIPULATION OF A GAME CONTROLLER BODY", to inventors Ser. No. 11/429,414, which is incorporated herein by reference. The console 110 may include an acoustic transducer, such as a microphone array 118. The controller 110 may also include an acoustic signal generator 210 (e.g., a speaker) to provide a source of sound to facilitate acoustic tracking of the controller 110 with the microphone array 118 and appropriate acoustic signal processing, e.g., as described in U.S. patent application Ser. No. 11/381,724, which is incorporated herein by reference.

In general, signals from the inertial sensor 112 are used to generate position and orientation data for the controller 110. Such data may be used to calculate many physical aspects of the movement of the controller 110, such as for example its acceleration and velocity along any axis, its tilt, pitch, yaw, roll, as well as any telemetry points of the controller 110. As used herein, telemetry generally refers to remote measurement and reporting of information of interest to a system or to the system's designer or operator.

The ability to detect and track the movements of the controller 110 makes it possible to determine whether any pre-defined movements of the controller 110 are performed. That is, certain movement patterns or gestures of the controller 110 may be predefined and used as input commands for the game or other simulation. For example, a plunging downward gesture of the controller 110 may be defined as one command, a twisting gesture of the controller 110 may be defined as another command, a shaking gesture of the controller 110 may be defined as another command, and so on. In this way the manner in which the user 108 physically moves the controller 110 is used as another input for controlling the game, which provides a more stimulating and entertaining experience for the user.

Figure 3:
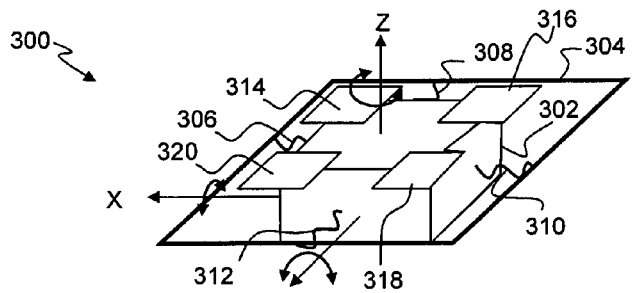
FIG. 3 is a three-dimensional schematic diagram illustrating an accelerometer that may be used in a controller according to an embodiment of the present invention.

By way of example and without limitation, the inertial sensor 112 may be an accelerometer. FIG. 3 depicts an example of an accelerometer 300 in the form of a simple mass 302 elastically coupled at four points to a frame 304, e.g., by springs 306, 308, 310, 312. Pitch and roll axes (indicated by X and Y, respectively) lie in a plane that intersects the frame. A yaw axis Z is oriented perpendicular to the plane containing the pitch axis X and the roll axis Y. The frame 304 may be mounted to the controller 110 in any suitable fashion. As the frame 304 (and the joystick controller 110) accelerates and/or rotates the mass 302 may displace relative to the frame 304 and the springs 306, 208, 310, 312 may elongate or compress in a way that depends on the amount and direction of translational and/or rotational acceleration and/or the angle of pitch and/or roll and/or yaw. The displacement and of the mass 302 and/or compression or elongation of the springs 306, 308, 310, 312 may be sensed, e.g., with appropriate sensors 314, 316, 318, 320 and converted to signals that depend in known or determinable way on the amount acceleration of pitch and/or roll.

There are a number of different ways to track the position of the mass and/or or the forces exerted on it, including resistive strain gauge material, photonic sensors, magnetic sensors, hall-effect devices, piezoelectric devices, capacitive sensors, and the like. Embodiments of the invention may include any number and type or combination of types of sensors. By way of example, and without limitation, the sensors 314, 316, 318, 320 may be gap closing electrodes placed above the mass 302. A capacitance between the mass and each electrode changes as the position of the mass changes relative to each electrode. Each electrode may be connected to a circuit that produce a signal related to the capacitance (and therefore to the proximity) of the mass 302 relative to the electrode. In addition, the springs 306, 308, 310, 312 may include resistive strain gauge sensors that produce signals that are related to the compression or elongation of the springs.

In some embodiments, the frame 304 may be gimbal mounted to the controller 110 so that the accelerometer 300 maintains a fixed orientation with respect to the pitch and/or roll and/or yaw axes. In such a manner, the controller axes X, Y, Z may be directly mapped to corresponding axes in real space without having to take into account a tilting of the controller axes with respect to the real space coordinate axes.

Figure 4:
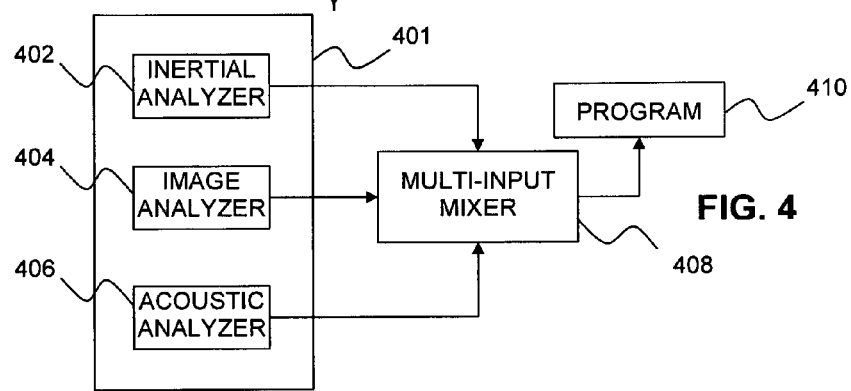
FIG. 4 is a block diagram of a system for mixing various control inputs according to an embodiment of the present invention.

As discussed above, data from inertial, image capture and acoustic sources may be analyzed to generate a path that tracks the position and/or orientation of the controller 110. As shown in the block diagram of FIG. 4 a system 400 according to an embodiment of the invention may include an inertial analyzer 402, an image analyzer 404 and an acoustic analyzer 406. Each of these analyzers receives signals from a sensed environment 401. The analyzers 402, 406, 404 may be implemented in hardware, in software (or firmware) or some combination of two or more of these. Each of the analyzers produces tracking information related the position and/or orientation of an object of interest. By way of example, the object of interest may be the controller 110 referred to above. The image analyzer 404 may operate in connection with and to form fields below and with respect to methods described in U.S. patent application Ser. No. 11/382,034. The inertial analyzer 402 may operate in connection with and to form fields below and with respect to methods described in U.S. patent application Ser. No. 11/382,033 entitled "SYSTEM, METHOD, AND APPARATUS FOR THREE-DIMENSIONAL INPUT CONTROL". The acoustic analyzer 406 may operate in connection with and to form fields below and with respect to methods described in U.S. patent application Ser. No. 11/381,724.

The analyzers 402, 404 and 406 may be regarded as being associated with different channels of inputs of position and/or orientation information. The Mixer 408 may accept multiple input channels and such channels may contain sample data characterizing the sensed environment 401, typically from the perspective of the channel. The position and/or orientation information generated by the inertial analyzer 402, image analyzer 404 and acoustic analyzer 406 can be coupled into the input of a mixer 408. The Mixer 408 and analyzers 402, 404, 406 may be queried by a game software 410 and may be configured to interrupt game software in response to events. Events may included gesture recognition events, gearing changes, configuration changes, setting noise levels, setting sampling rate, changing mapping chains, etc, examples of which are discussed below. The mixer 408 may operate in connection with and to form fields below and with respect to methods described herein.

Figure 5A:
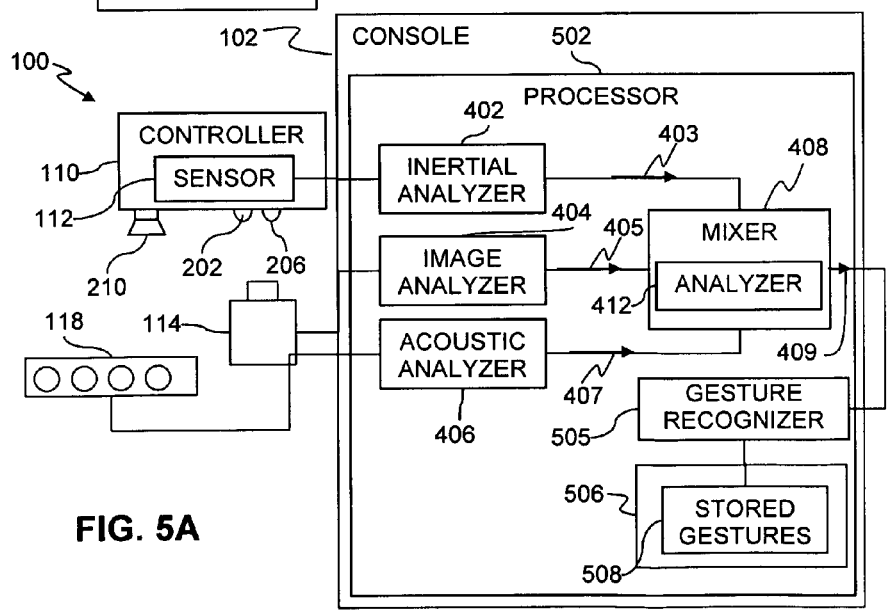
FIG. 5A is a block diagram of a portion of the video game system of FIG. 1.

As discussed above, signals from different input channels, e.g., inertial sensors, video images and/or acoustic sensors may be analyzed by the inertial analyzer 402, image analyzer 404 and acoustic analyzer 406, respectively, to determine the motion and/or orientation of the controller 110 during play of a video game according to an inventive method. Such a method may be implemented as a series of processor executable program code instructions stored in a processor readable medium and executed on a digital processor. For example, as depicted in FIG. 5A, the video game system 100 may include on the console 102 having the inertial analyzer 402, image analyzer 404 and acoustic analyzer 406 implemented either in hardware or software. By way of example, the analyzers 402, 404, 406 may be implemented as software instructions running on a suitable processor unit 502. By way of example, the processor unit 502 may be a digital processor, e.g., a microprocessor of a type commonly used in video game consoles. A portion of the instructions may be stored in a memory 506. Alternatively, the inertial analyzer 402, image analyzer 404 and acoustic analyzer 406 may be implemented in hardware, e.g., as an application specific integrated circuit (ASIC). Such analyzer hardware may be located on the controller 110 or on the console 102 or may be remotely located elsewhere. In hardware implementations, the analyzers 402, 404, 406 may be programmable in response to external signals e.g., from the processor 502 or some other remotely located source, e.g., connected by USB cable, wireless connection, or over a network.

The inertial analyzer 402 may include or implement instructions that analyze the signals generated by the inertial sensor 112 and utilize information regarding position and/or orientation of the controller 110. Similarly, the image analyzer 404 may implement instructions that analyze images captured by the image capture unit 114. In addition, the acoustic analyzer may implement instructions that analyze images captured by the microphone array 118. As shown in the flow diagram 510 of FIG. 5B these signals and/or images may be received by the analyzers 402, 404, 406 as indicated at block 512. The signals and/or images may be analyzed by the analyzers 402, 404, 406 to determine inertial tracking information 403, image tracking information 405 and acoustic tracking information 407 regarding the position and/or orientation of the controller 110 as indicated at block 514. The tracking information 403, 405, 407 may be related to one or more degrees of freedom. It is preferred that six degrees of freedom are tracked to characterize the manipulation of the controller 110 or other tracked object. Such degrees of freedom may relate to the controller tilt, yaw, roll and position, velocity or acceleration along the x, y and z-axis.

As indicated at block 516, the mixer 408 mixes the inertial information 403, image information 405 and acoustic information 407 to generate refined position and/or orientation information 409. By way of example, the mixer 408 may apply different weights to the inertial, image and acoustic tracking information 403, 405, 407 based on game or environmental conditions and then take a weighted average. In addition, the mixer 408 may include its own mixer analyzer 412 that analyzes the combined position/orientation information and generates its own resulting "mixer" information that involves combinations of the information generated by the other analyzers.

In an embodiment of the present invention the mixer 408 may assign a distribution value to the tracking information 403, 405, 407 from the analyzers 402, 404, 406. As noted above, certain sets of input control data may be averaged. In the present embodiment, however, the input control data is assigned a value prior to its being averaged whereby the input control data from some analyzers is of more analytical importance than from others.

The mixer 408 may take on a number of functionalities in the context of the present system including observation, correction, stabilization, derivation, combination, routing, mixing, reporting, buffering, interrupting other processes and analysis. Such may be performed with respect to the tracking information 403, 405, 407 received from one or more of the analyzers 402, 404, 406. While each of the analyzers 402, 404, 406 may receive and/or derive certain tracking information, the mixer 408 may be implemented to optimize the use of the received tracking information 403, 405, 407 and generate refined tracking information 409.

The analyzers 402, 404, 406 and mixer 408 are preferably configured to provide tracking information similar output formats. Tracking information parameters from any analyzer element 402, 404, 406 can be mapped to a single parameter in an analyzer. Alternatively, the mixer 408 may form tracking information for any of the analyzers 402, 404, 406 by processing one or more tracking information parameters from one or more of analyzers 402, 404, 406. The mixer may combine two or more elements of tracking information of the same parameter type taken from the analyzers 402, 404, 406 and/or perform functions across multiple parameters of tracking information generated by the analyzers to create a synthetic set of output having the benefit of being generated from multiple channels of input.

The refined tracking information 409 may be utilized during play of a video game with the system 100 as indicated at block 518. In certain embodiments, the position and/or orientation information may be used in relation to gestures made by the user 108 during game play. In some embodiments the mixer 408 may operate in conjunction with the gesture recognizer 505 to associate at least one action in a game environment with one or more user actions from the user (e.g., manipulation of the controller in space).

Figure 5B:
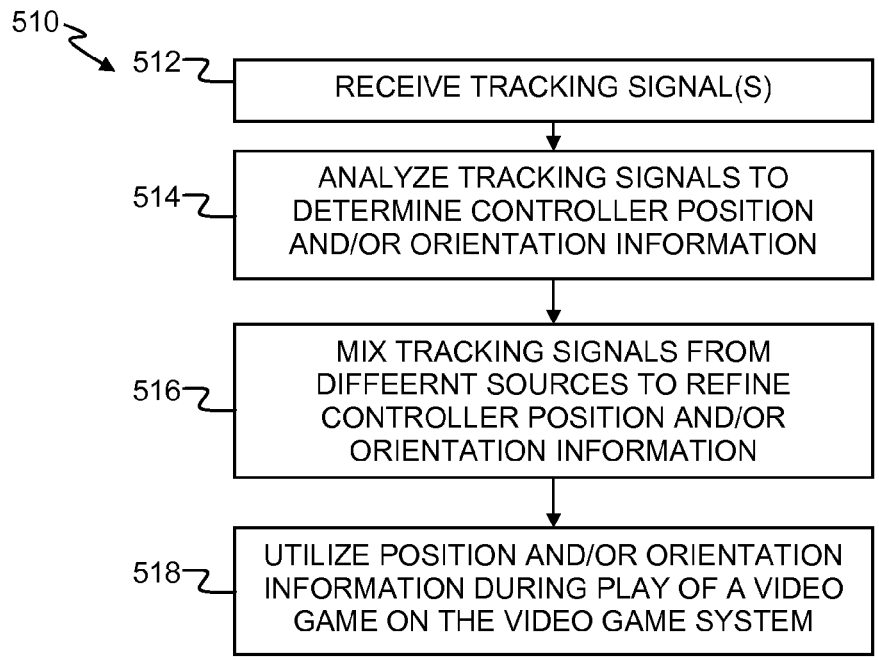
FIG. 5B is a flow diagram of a method for tracking a controller of a video game system according to an embodiment of the present invention.
Figure 5C:
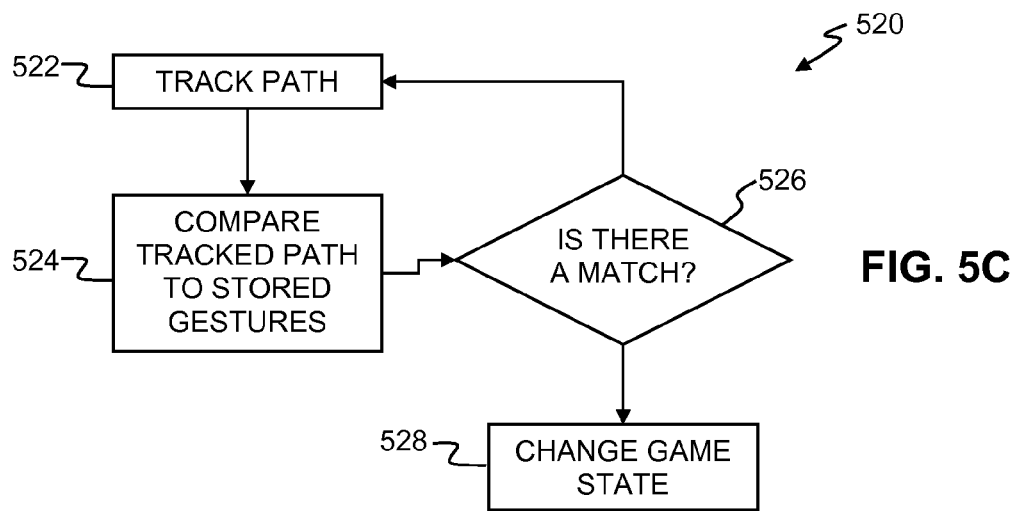
FIG. 5C is a flow diagram illustrating a method for utilizing position and/or orientation information during game play on a video game system according to an embodiment of the present invention.

As indicated in the flow diagram 520 of FIG. 5C, a path of the controller 110 may be tracked using the position and/or orientation information as indicated at block 522. By way of example, and without limitation, the path may include a set of points representing a position of the center of mass of the controller with respect to some system of coordinates. Each position point may be represented by one or more coordinates, e.g., X, Y and Z coordinates in a Cartesian coordinate system. A time may be associated with each point on the path so that both the shape of the path and the progress of the controller along the path may be monitored. In addition, each point in the set may have associated with it data representing an orientation of the controller, e.g., one or more angles of rotation of the controller about its center of mass. Furthermore, each point on the path may have associated with it values of velocity and acceleration of the center of mass of the controller and rates of angular rotation and angular acceleration of the controller about its center of mass.

As indicated at block 524, the tracked path may be compared to one or more stored paths corresponding to known and/or pre-recorded gestures 508 that are relevant to the context of the video game being played. Recognizer 505 may be configured to recognize a user or process audio authenticated gestures, etc. For example, a user may be identified by the recognizer 505 through a gesture and that a gesture may be specific to a user. Such a specific gestures may recorded and included among the pre-recorded gestures 508 stored in memory 506. The recordation process may optionally store audio generated during recordation of a gesture. The sensed environment is sampled into a multi-channel analyzer and processed. The processor may reference gesture models to determine and authenticate and/or identify a user or objects based on voice or acoustic patterns and to a high degree of accuracy and performance.

As indicated in FIG. 5A, data 508 representing the gestures may be stored in the memory 506. Examples of gestures include, but are not limited to throwing an object such as a ball, swinging an object such as a bat or golf club, pumping hand pump, opening or closing a door or window, turning steering wheel or other vehicle control, martial arts moves such as punches, sanding movements, wax on wax off, paint the house, shakes, rattles, rolls, football pitches, turning knob movements, 3D MOUSE movements, scrolling movements, movements with known profiles, any recordable movement, movements along any vector back and forth i.e. pump the tire but at some arbitrary orientation in space, movements along a path, movements having precise stop and start times, any time based user manipulation that can be recorded, tracked and repeated within the noise floor, splines, and the like. Each of these gestures may be pre-recorded from path data and stored as a time-based model. Comparison of the path and stored gestures may start with an assumption of a steady state if the path deviates from a steady state the path can be compared to the stored gestures by a process of elimination. If at block 526 there is no match, the analyzer may continue tracking the path of the controller 110 at block 522. If there is a sufficient match between the path (or a portion thereof) and a stored gesture the state of the game may be changed as indicated at 528.

Changes of state of the game may include, but are not limited to interrupts, sending control signals, changing variables, etc.

Here is one example of this can occur. Upon determining that the controller 110 has left a steady state the path an analyzer 402, 404, 406, or 412 tracks movement of the controller 110. As long as the path of the controller 110 complies with a path defined in the stored gesture models 508, those gestures are possible "hits". If the path of the controller 110 deviates (within the noise tolerance setting) from any gesture model 508, that gesture model is removed from the hit list. Each gesture reference model includes a time-base in which the gesture is recorded. The analyzer 402, 404, 406, or 412 compares the controller path data to the stored gestures 508 at the appropriate time index. Occurrence of a steady state condition resets the clock. When deviating from steady state (i.e. when movements are tracked outside of the noise threshold) the hit list is populated with all potential gesture models. The clock is started and movements of the controller are compared against the hit list. Again, the comparison is a walk through time. If any gesture in the hit list reaches the end of the gesture then it is a hit.

In certain embodiments, the mixer 408 and/or individual analyzers 402, 404, 406, 412 may inform a game program when certain events occur. Examples of such events include the following:

INTERRUPT ZERO-ACCELERATION POINT REACHED (X AND/OR Y AN/OR Z AXIS) In certain game situations the analyzer may notify or interrupt routine within the game program when acceleration of the controller changes at the inflection points. For example, the user 108 may use the controller 110 to control a game avatar representing a quarterback in a football simulation game. The analyzer may track the controller (representing the football) via a path generated from signals from the inertial sensor 112. A particular change in acceleration of the controller 110 may signal release of the football. At this point, the analyzer may trigger another routine within the program (e.g., a physics simulation package) to simulate the trajectory of the football based on the position, and/or velocity and/or orientation of the controller at the point of release.

INTERRUPT NEW GESTURE RECOGNIZED

In addition, the analyzer 502 may be configured by one or more inputs. Examples of such inputs include, but are not limited to:

SET NOISE LEVEL (X, Y or Z AXIS) The noise level may be a reference tolerance used when analyzing jitter of the user's hands in the game.

SET SAMPLING RATE. As used herein, the sampling rate may refer to how often the analyzer 502 samples the signals from the inertial sensor. The sampling rate may be set to oversample or average the signal.

SET GEARING. As used herein gearing generally refers to the ratio of controller movements to movements occurring within the game. Examples of such "gearing" in the context of control of a video game may be found in U.S. patent application Ser. No. 11/382,040, filed May 7, 2006, which is incorporated herein by reference.

SET MAPPING CHAIN. As used herein, a mapping chain refers to a map of gesture models. The gesture model maps can be made for a specific input Channel (e.g., for path data generated from inertial sensor signals only) or for a hybrid Channel formed in a mixer unit. Three input Channels may be served by two or more different Analyzers that are similar to the inertial analyzer 402. Specifically, these may include: the inertial analyzer 402 as described herein, a video analyzer as described e.g., in U.S. patent application Ser. No. 11/382,034, entitled SCHEME FOR DETECTING AND TRACKING USER MANIPULATION OF A GAME CONTROLLER BODY, which is incorporated herein by reference, and an Acoustic Analyzer, e.g., as described in U.S. patent application Ser. No. 11/381,721, which is incorporated herein by reference. The Analyzers can be configured with a mapping chain. Mapping chains can be swapped out by the game during gameplay as can settings to the Analyzer and to the Mixer.

Referring to again to FIG. 5B, block 512, those of skill in the art will recognize that there are numerous ways to generate signals from the inertial sensor 112. A few examples, among others have been described above with respect to FIGS. 3A-3E. Referring to block 514, there are numerous ways to analyze the sensor signals generated in block 512 to obtain information relating to the position and/or orientation of the controller 110. By way of example and without limitation the tracking information may include, but is not limited to information regarding the following parameters individually or in any combination:

CONTROLLER ORIENTATION. Orientation of the controller 110 may be expressed in terms of pitch, roll or yaw angle with respect to some reference orientation, e.g., in radians). Rates of change of controller orientation (e.g., angular velocities or angular accelerations) may also be included in the position and/or orientation information. Where the inertial sensor 112 includes a gyroscopic sensor controller orientation information may be obtained directly in the form of one or more output values that are proportional to angles of pitch, roll or yaw.

CONTROLLER POSITION (e.g., Cartesian coordinates X,Y,Z of the controller 110 in some frame of reference)
CONTROLLER X-AXIS VELOCITY
CONTROLLER Y-AXIS VELOCITY
CONTROLLER Z-AXIS VELOCITY
CONTROLLER X-AXIS ACCELERATION
CONTROLLER Y-AXIS ACCELERATION
CONTROLLER Z-AXIS ACCELERATION It is noted that with respect to position, velocity and acceleration the position and/or orientation information may be expressed in terms of coordinate systems other than Cartesian. For example, cylindrical or spherical coordinates may be used for position, velocity and acceleration. Acceleration information with respect to the X, Y and Z axes may be obtained directly from an accelerometer type sensor, e.g., as described above with respect to FIGS. 3A-3E. The X, Y and Z accelerations may be integrated with respect to time from some initial instant to determine changes in X, Y and Z velocities. These velocities may be computed by adding the velocity changes to known values of the X-, Y- and Z-velocities at the initial instant in time. The X, Y and Z velocities may be integrated with respect to time to determine X-, Y-, and Z-displacements of the controller. The X-, Y-, and Z-positions may be determined by adding the displacements to known X-, Y-, and Z-, positions at the initial instant.

STEADY STATE Y/N—This particular information indicates whether the controller is in a steady state, which may be defined as any position, which may be subject to change too. In a preferred embodiment the steady state position may be one wherein the controller is held in a more or less level orientation at a height roughly even with a user's waist.

TIME SINCE LAST STEADY STATE generally refers to data related to how long a period of time has passed since a steady state (as referenced above) was last detected. That determination of time may, as previously noted, be calculated in real-time, processor cycles, or sampling periods. The Time Since Last Steady State data time may be important with regard to resetting tracking of a controller with regard to an initial point to ensure accuracy of character or object mapping in a game environment. This data may also be important with regard to determining available actions/gestures that might be subsequently executed in a game environment (both exclusively and inclusively).

LAST GESTURE RECOGNIZED generally refers to the last gesture recognized either by the gesture recognizer 505 (which may be implemented in hardware or software. The identification of a last gesture recognized may be important with respect to the fact that a previous gesture may be related to the possible gestures that may be subsequently recognized or some other action that takes place in the game environment.

TIME LAST GESTURE RECOGNIZED

The above outputs can be sampled at any time by a game program or software.

In an embodiment of the present invention the mixer 408 may assign a distribution value to the tracking information 403, 405, 407 from the analyzers 402, 404, 406. As noted above, certain sets of input control data may be averaged. In the present embodiment, however, the input control data is assigned a value prior to its being averaged whereby the input control data from some analyzers is of more analytical importance than from others.

For example, the mixer 408 may require tracking information related to acceleration and steady state. The mixer 408 would then receive the tracking information 403, 405, 407 as described above. The tracking information may include parameters relating to acceleration and steady state, e.g., as described above. Prior to averaging the data representing this information, the mixer 408 may assign distribution values to tracking information data set 403, 405, 407. For example, the x- and y-acceleration parameters from the inertial analyzer 402 may be weighted at a value of 90%. The x- and y-acceleration data from the image analyzer 406, however, may be weighted at only 10%. The acoustic analyzer tracking information 407 as it pertains to acceleration parameters may be weighted at zero percent, that is, the data has no value.

Similarly, the Z-axis tracking information parameters from the inertial analyzer 402 may be weighted at 10% whereas the image analyzer Z-axis tracking information may be weighted at 90%. The acoustic analyzer tracking information 407 may, again, be weighted at 0% value but steady state tracking information from the acoustic analyzer 406 may be weighted at 100% with the remaining analyzer tracking information be weighted at 0%.

After the appropriate distribution weight has been assigned, the input control data may be averaged in conjunction with that weight to arrive at a weighted average input control data set that is subsequently analyzed by the gesture recognizer 505 and associated with a particular action in the game environment. The values associated may be pre-defined by the mixer 408 or by a particular game title. The values may also be the result of the mixer 408 identifying a particular quality of data coming from the various analyzers and thus making a dynamic adjustment as is further discussed below. The adjustment may also be the result of building a historical knowledge base of when particular data is of particular value in a particular environment and/or in response to the particularities of a given game title.

The mixer 408 may be configured to operate dynamically during game play. For example, as the mixer 408 receives various input control data, it may recognize that certain data is consistently outside an acceptable range or quality of data or reflects corrupt data that may be indicative of a processing error at the related input device.

Additionally, certain conditions in a real-world environment might change. For example, natural light in the user's at-home game environment might be increasing as the morning turns to afternoon causing problems with image data capture. Further, a neighborhood or household might become noisier as the day goes on causing problems with audio data capture. Likewise, if a user has been playing for several hours, their reflexes may become less sharp thus causing problems with interpretation of inertial data.

In these instances, or in any other instance wherein the quality of a particular form of input control data is in question, the mixer 408 may dynamically reassign distribution weight to a particular set of data coming from a particular device such that more or less importance is given to particular input control data as described above. Similarly, the game environment may change over the course of the game wherein the needs of a particular game change thus requiring a reassignment of value or need for particular input control data.

Similarly, the mixer 408 may recognize that certain data being passed on to the gesture recognizer 505 is being processed incorrectly, slowly, or not at all based on processing errors or feedback data that may be generated by the gesture recognizer 505. In response to this feedback or in recognition of these processing difficulties (e.g., while the image analysis data is within an acceptable range, errors result when an association is made by the gesture recognizer 505), the mixer 408 may adjust what input control data it seeks from what analyzer and when, if at all. The mixer 408 may further require certain analysis and processing of input control data by the proper analyzer before it is passed to the mixer 408, which may re-process the data (e.g., average the data) such that a further layer of assurance is made that the data passed to the gesture recognizer 505 will be processed effectively and appropriately.

In some embodiments, the mixer 408 may recognize that certain data is corrupt, ineffective, or outside a particular range and may call upon particular input control data or variable related to that data such that it may replace incorrect data or properly analyze and calculate certain data with respect to the necessary variables.

According to embodiments of the present invention, a video game system and method of the type described above may be implemented as depicted in FIG. 6. A video game system 600 may include a processor 601 and a memory 602 (e.g., RAM, DRAM, ROM, and the like). In addition, the video game system 600 may have multiple processors 601 if parallel processing is to be implemented. The memory 602 includes data and game program code 604, which may include portions that are configured as described above. Specifically, the memory 602 may include inertial signal data 606 which may include stored controller path information as described above. The memory 602 may also contain stored gesture data 608, e.g., data representing one or more gestures relevant to the game program 604. Coded instructions executed on the processor 602 may implement a multi-input mixer 605, which may be configured and function as described above.

Figure 6:
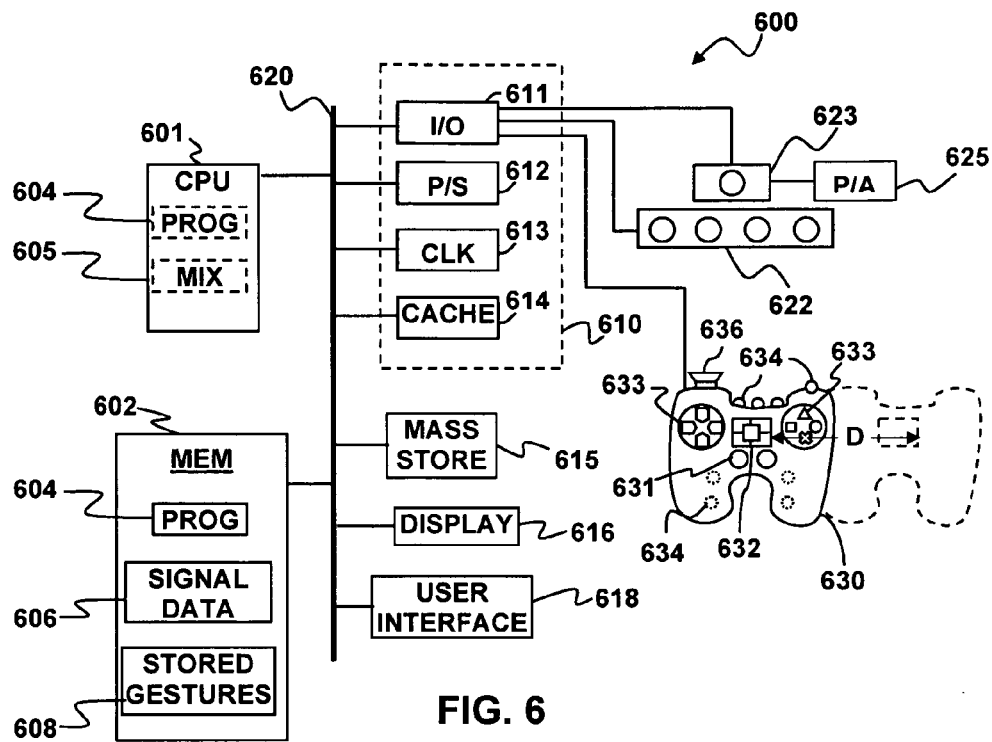
FIG. 6 is a block diagram illustrating a video game system according to an embodiment of the present invention.

The system 600 may also include well-known support functions 610, such as input/output (I/O) elements 611, power supplies (P/S) 612, a clock (CLK) 613 and cache 614. The apparatus 600 may optionally include a mass storage device 615 such as a disk drive, CD-ROM drive, tape drive, or the like to store programs and/or data. The controller may also optionally include a display unit 616 and user interface unit 618 to facilitate interaction between the controller 600 and a user. The display unit 616 may be in the form of a cathode ray tube (CRT) or flat panel screen that displays text, numerals, graphical symbols or images. The user interface 618 may include a keyboard, mouse, joystick, light pen or other device. In addition, the user interface 618 may include a microphone, video camera or other signal transducing device to provide for direct capture of a signal to be analyzed. The processor 601, memory 602 and other components of the system 600 may exchange signals (e.g., code instructions and data) with each other via a system bus 620 as shown in FIG. 6.

A microphone array 622 may be coupled to the system 600 through the I/O functions 611. The microphone array may include between about 2 and about 8 microphones, preferably about 4 microphones with neighboring microphones separated by a distance of less than about 4 centimeters, preferably between about 1 centimeter and about 2 centimeters. Preferably, the microphones in the array 622 are omni-directional microphones. An optional image capture unit 623 (e.g., a digital camera) may be coupled to the apparatus 600 through the I/O functions 611. One or more pointing actuators 625 that are mechanically coupled to the camera may exchange signals with the processor 601 via the I/O functions 611.

As used herein, the term I/O generally refers to any program, operation or device that transfers data to or from the system 600 and to or from a peripheral device. Every data transfer may be regarded as an output from one device and an input into another. Peripheral devices include input-only devices, such as keyboards and mouses, output-only devices, such as printers as well as devices such as a writable CD-ROM that can act as both an input and an output device. The term "peripheral device" includes external devices, such as a mouse, keyboard, printer, monitor, microphone, game controller, camera, external Zip drive or scanner as well as internal devices, such as a CD-ROM drive, CD-R drive or internal modem or other peripheral such as a flash memory reader/writer, hard drive.

In certain embodiments of the invention, the apparatus 600 may be a video game unit, which may include a controller 630 coupled to the processor via the I/O functions 611 either through wires (e.g., a USB cable) or wirelessly. The controller 630 may have analog joystick controls 631 and conventional buttons 633 that provide control signals commonly used during playing of video games. Such video games may be implemented as processor readable data and/or instructions from the program 604 which may be stored in the memory 602 or other processor readable medium such as one associated with the mass storage device 615.

The joystick controls 631 may generally be configured so that moving a control stick left or right signals movement along the X axis, and moving it forward (up) or back (down) signals movement along the Y axis. In joysticks that are configured for three-dimensional movement, twisting the stick left (counter-clockwise) or right (clockwise) may signal movement along the Z axis. These three axis—X Y and Z—are often referred to as roll, pitch, and yaw, respectively, particularly in relation to an aircraft.

In addition to conventional features, the controller 630 may include one or more inertial sensors 632, which may provide position and/or orientation information to the processor 601 via an inertial signal. Orientation information may include angular information such as a tilt, roll or yaw of the controller 630. By way of example, the inertial sensors 632 may include any number and/or combination of accelerometers, gyroscopes or tilt sensors. In a preferred embodiment, the inertial sensors 632 include tilt sensors adapted to sense orientation of the joystick controller with respect to tilt and roll axes, a first accelerometer adapted to sense acceleration along a yaw axis and a second accelerometer adapted to sense angular acceleration with respect to the yaw axis. An accelerometer may be implemented, e.g., as a MEMS device including a mass mounted by one or more springs with sensors for sensing displacement of the mass relative to one or more directions. Signals from the sensors that are dependent on the displacement of the mass may be used to determine an acceleration of the joystick controller 630. Such techniques may be implemented by instructions from the game program 604 which may be stored in the memory 602 and executed by the processor 601.

By way of example an accelerometer suitable as the inertial sensor 632 may be a simple mass elastically coupled at three or four points to a frame, e.g., by springs. Pitch and roll axes lie in a plane that intersects the frame, which is mounted to the joystick controller 630. As the frame (and the joystick controller 630) rotates about pitch and roll axes the mass will displace under the influence of gravity and the springs will elongate or compress in a way that depends on the angle of pitch and/or roll. The displacement and of the mass can be sensed and converted to a signal that is dependent on the amount of pitch and/or roll. Angular acceleration about the yaw axis or linear acceleration along the yaw axis may also produce characteristic patterns of compression and/or elongation of the springs or motion of the mass that can be sensed and converted to signals that are dependent on the amount of angular or linear acceleration. Such an accelerometer device can measure tilt, roll angular acceleration about the yaw axis and linear acceleration along the yaw axis by tracking movement of the mass or compression and expansion forces of the springs. There are a number of different ways to track the position of the mass and/or or the forces exerted on it, including resistive strain gauge material, photonic sensors, magnetic sensors, hall-effect devices, piezoelectric devices, capacitive sensors, and the like.

In addition, the joystick controller 630 may include one or more light sources 634, such as light emitting diodes (LEDs). The light sources 634 may be used to distinguish one controller from the other. For example one or more LEDs can accomplish this by flashing or holding an LED pattern code. By way of example, 5 LEDs can be provided on the joystick controller 630 in a linear or two-dimensional pattern. Although a linear array of LEDs is preferred, the LEDs may alternatively, be arranged in a rectangular pattern or an arcuate pattern to facilitate determination of an image plane of the LED array when analyzing an image of the LED pattern obtained by the image capture unit 623. Furthermore, the LED pattern codes may also be used to determine the positioning of the joystick controller 630 during game play. For instance, the LEDs can assist in identifying tilt, yaw and roll of the controllers. This detection pattern can assist in providing a better user/feel in games, such as aircraft flying games, etc. The image capture unit 623 may capture images containing the joystick controller 630 and light sources 634. Analysis of such images can determine the location and/or orientation of the joystick controller. Such analysis may be implemented by program code instructions 604 stored in the memory 602 and executed by the processor 601. To facilitate capture of images of the light sources 634 by the image capture unit 623, the light sources 634 may be placed on two or more different sides of the joystick controller 630, e.g., on the front and on the back (as shown in phantom). Such placement allows the image capture unit 623 to obtain images of the light sources 634 for different orientations of the joystick controller 630 depending on how the joystick controller 630 is held by a user.

In addition the light sources 634 may provide telemetry signals to the processor 601, e.g., in pulse code, amplitude modulation or frequency modulation format. Such telemetry signals may indicate which joystick buttons are being pressed and/or how hard such buttons are being pressed. Telemetry signals may be encoded into the optical signal, e.g., by pulse coding, pulse width modulation, frequency modulation or light intensity (amplitude) modulation. The processor 601 may decode the telemetry signal from the optical signal and execute a game command in response to the decoded telemetry signal. Telemetry signals may be decoded from analysis of images of the joystick controller 630 obtained by the image capture unit 623. Alternatively, the apparatus 601 may include a separate optical sensor dedicated to receiving telemetry signals from the lights sources 634. The use of LEDs in conjunction with determining an intensity amount in interfacing with a computer program is described, e.g., in U.S. patent application Ser. No. 11/429,414, to Richard L. Marks et al., entitled "Computer Image and Audio Processing of Intensity and Input Devices for Interfacing With A Computer Program", filed May 4, 2006, which is incorporated herein by reference in its entirety. In addition, analysis of images containing the light sources 634 may be used for both telemetry and determining the position and/or orientation of the joystick controller 630. Such techniques may be implemented by instructions of the program 604 which may be stored in the memory 602 and executed by the processor 601.

The processor 601 may use the inertial signals from the inertial sensor 632 in conjunction with optical signals from light sources 634 detected by the image capture unit 623 and/or sound source location and characterization information from acoustic signals detected by the microphone array 622 to deduce information on the location and/or orientation of the controller 630 and/or its user. For example, "acoustic radar" sound source location and characterization may be used in conjunction with the microphone array 622 to track a moving voice while motion of the joystick controller is independently tracked (through the inertial sensor 632 and or light sources 634). In acoustic radar select a pre-calibrated listening zone is selected at runtime and sounds originating from sources outside the pre-calibrated listening zone are filtered out. The pre-calibrated listening zones may include a listening zone that corresponds to a volume of focus or field of view of the image capture unit 623. Examples of acoustic radar are described in detail in U.S. patent application Ser. No. 11/381,724, to Xiadong Mao entitled "METHODS AND APPARATUS FOR TARGETED SOUND DETECTION AND CHARACTERIZATION", filed May 4, 2006, which is incorporated herein by reference. Any number of different combinations of different modes of providing control signals to the processor 601 may be used in conjunction with embodiments of the present invention. Such techniques may be implemented by program code instructions 604 which may be stored in the memory 602 and executed by the processor 601 and may optionally include one or more instructions that direct the one or more processors to select a pre-calibrated listening zone at runtime and filter out sounds originating from sources outside the pre-calibrated listening zone. The pre-calibrated listening zones may include a listening zone that corresponds to a volume of focus or field of view of the image capture unit 623.

The program 604 may optionally include one or more instructions that direct the one or more processors to produce a discrete time domain input signal $x_m(t)$ from microphones $M_0 \ldots M_M$, of the microphone array 622, determine a listening sector, and use the listening sector in a semi-blind source separation to select the finite impulse response filter coefficients to separate out different sound sources from input signal $x_m(t)$. The program 604 may also include instructions to apply one or more fractional delays to selected input signals $x_m(t)$ other than an input signal $x_0(t)$ from a reference microphone $M_0$. Each fractional delay may be selected to optimize a signal to noise ratio of a discrete time domain output signal y(t) from the microphone array. The fractional delays may be selected to such that a signal from the reference microphone $M_0$ is first in time relative to signals from the other microphone(s) of the array. The program 604 may also include instructions to introduce a fractional time delay Δ into an output signal y(t) of the microphone array so that: $y(t+\Delta) = x(t+\Delta)*b_0 + x(t-1+\Delta)*b_1 + x(t-2+\Delta)*b_2 + \ldots + x(t-N+\Delta)b_N$, where Δ is between zero and ±1. Examples of such techniques are described in detail in U.S. patent application Ser. No. 11/381,729, to Xiadong Mao, entitled "ULTRA SMALL MICROPHONE ARRAY" filed May 4, 2006, the entire disclosures of which are incorporated by reference.

The program 604 may include one or more instructions which, when executed, cause the system 600 to select a pre-calibrated listening sector that contains a source of sound. Such instructions may cause the apparatus to determine whether a source of sound lies within an initial sector or on a particular side of the initial sector. If the source of sound does not lie within the default sector, the instructions may, when executed, select a different sector on the particular side of the default sector. The different sector may be characterized by an attenuation of the input signals that is closest to an optimum value. These instructions may, when executed, calculate an attenuation of input signals from the microphone array 622 and the attenuation to an optimum value. The instructions may, when executed, cause the apparatus 600 to determine a value of an attenuation of the input signals for one or more sectors and select a sector for which the attenuation is closest to an optimum value. Examples of such a technique are described, e.g., in U.S. patent application Ser. No. 11/381,725, to Xiadong Mao, entitled "METHODS AND APPARATUS FOR TARGETED SOUND DETECTION" filed May 4, 2006, the disclosures of which are incorporated herein by reference.

Signals from the inertial sensor 632 may provide part of a tracking information input and signals generated from the image capture unit 623 from tracking the one or more light sources 634 may provide another part of the tracking information input. By way of example, and without limitation, such "mixed mode" signals may be used in a football type video game in which a Quarterback pitches the ball to the right after a head fake head movement to the left. Specifically, a game player holding the controller 630 may turn his head to the left and make a sound while making a pitch movement swinging the controller out to the right like it was the football. The microphone array 620 in conjunction with "acoustic radar" program code can track the user's voice. The image capture unit 623 can track the motion of the user's head or track other commands that do not require sound or use of the controller. The sensor 632 may track the motion of the joystick controller (representing the football). The image capture unit 623 may also track the light sources 634 on the controller 630. The user may release of the "ball" upon reaching a certain amount and/or direction of acceleration of the joystick controller 630 or upon a key command triggered by pressing a button on the controller 630.

In certain embodiments of the present invention, an inertial signal, e.g., from an accelerometer or gyroscope may be used to determine a location of the controller 630. Specifically, an acceleration signal from an accelerometer may be integrated once with respect to time to determine a change in velocity and the velocity may be integrated with respect to time to determine a change in position. If values of the initial position and velocity at some time are known then the absolute position may be determined using these values and the changes in velocity and position. Although position determination using an inertial sensor may be made more quickly than using the image capture unit 623 and light sources 634 the inertial sensor 632 may be subject to a type of error known as "drift" in which errors that accumulate over time can lead to a discrepancy D between the position of the joystick 630 calculated from the inertial signal (shown in phantom) and the actual position of the joystick controller 630. Embodiments of the present invention allow a number of ways to deal with such errors.

For example, the drift may be cancelled out manually by re-setting the initial position of the controller 630 to be equal to the current calculated position. A user may use one or more of the buttons on the controller 630 to trigger a command to re-set the initial position. Alternatively, image-based drift may be implemented by re-setting the current position to a position determined from an image obtained from the image capture unit 623 as a reference. Such image-based drift compensation may be implemented manually, e.g., when the user triggers one or more of the buttons on the joystick controller 630. Alternatively, image-based drift compensation may be implemented automatically, e.g., at regular intervals of time or in response to game play. Such techniques may be implemented by program code instructions 604 which may be stored in the memory 602 and executed by the processor 601.

In certain embodiments it may be desirable to compensate for spurious data in the inertial sensor signal. For example the signal from the inertial sensor 632 may be oversampled and a sliding average may be computed from the oversampled signal to remove spurious data from the inertial sensor signal. In some situations it may be desirable to oversample the signal and reject a high and/or low value from some subset of data points and compute the sliding average from the remaining data points. Furthermore, other data sampling and manipulation techniques may be used to adjust the signal from the inertial sensor to remove or reduce the significance of spurious data. The choice of technique may depend on the nature of the signal, computations to be performed with the signal, the nature of game play or some combination of two or more of these. Such techniques may be implemented by instructions of the program 604 which may be stored in the memory 602 and executed by the processor 601.

The processor 601 may perform analysis of inertial signal data 606 as described above in response to the data 606 and program code instructions of a program 604 stored and retrieved by the memory 602 and executed by the processor module 601. Code portions of the program 604 may conform to any one of a number of different programming languages such as Assembly, C++, JAVA or a number of other languages. The processor module 601 forms a general-purpose computer that becomes a specific purpose computer when executing programs such as the program code 604. Although the program code 604 is described herein as being implemented in software and executed upon a general purpose computer, those skilled in the art will realize that the method of task management could alternatively be implemented using hardware such as an application specific integrated circuit (ASIC) or other hardware circuitry. As such, it should be understood that embodiments of the invention can be implemented, in whole or in part, in software, hardware or some combination of both.

In one embodiment, among others, the program code 604 may include a set of processor readable instructions that implement a method having features in common with the method 510 of FIG. 5B and the method 520 of FIG. 5C or some combination of two or more of these. The program code 604 may generally include one or more instructions that direct the one or more processors to analyze signals from the inertial sensor 632 to generate position and/or orientation information and utilize the information during play of a video game.

The program code 604 may optionally include processor executable instructions including one or more instructions which, when executed cause the image capture unit 623 to monitor a field of view in front of the image capture unit 623, identify one or more of the light sources 634 within the field of view, detect a change in light emitted from the light source(s) 634; and in response to detecting the change, triggering an input command to the processor 601. The use of LEDs in conjunction with an image capture device to trigger actions in a game controller is described e.g., in U.S. patent application Ser. No. 10/759,782 to Richard L. Marks, filed Jan. 16, 2004 and entitled: METHOD AND APPARATUS FOR LIGHT INPUT DEVICE, which is incorporated herein by reference in its entirety.

The program code 604 may optionally include processor executable instructions including one or more instructions which, when executed, use signals from the inertial sensor and signals generated from the image capture unit from tracking the one or more light sources as inputs to a game system, e.g., as described above. The program code 604 may optionally include processor executable instructions including one or more instructions which, when executed compensate for drift in the inertial sensor 632.

Although embodiments of the present invention are described in terms of examples related to a video game controller 630 games, embodiments of the invention, including the system 600 may be used on any user manipulated body, molded object, knob, structure, etc, with inertial sensing capability and inertial sensor signal transmission capability, wireless or otherwise.

Figure 7:
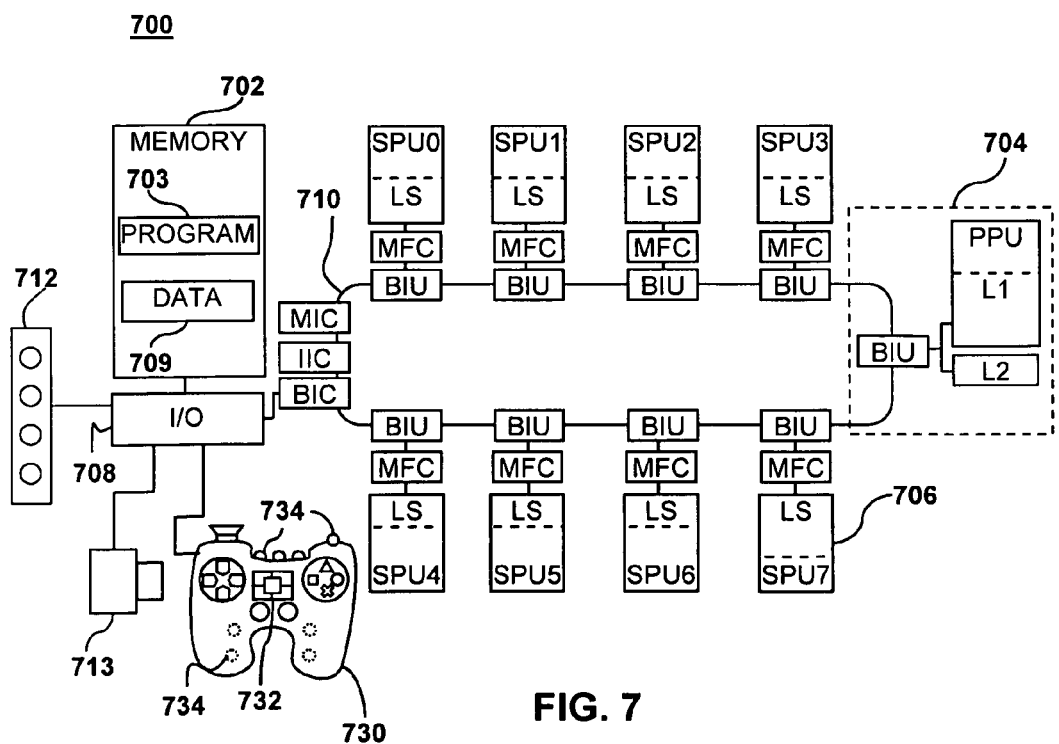
FIG. 7 is a block diagram of a cell processor implementation of the video game system according to an embodiment of the present invention.

By way of example, embodiments of the present invention may be implemented on parallel processing systems. Such parallel processing systems typically include two or more processor elements that are configured to execute parts of a program in parallel using separate processors. By way of example, and without limitation, FIG. 7 illustrates a type of cell processor 700 according to an embodiment of the present invention. The cell processor 700 may be used as the processor 601 of FIG. 6 or the processor 502 of FIG. 5A. In the example depicted in FIG. 7, the cell processor 700 includes a main memory 702, power processor element (PPE) 704, and a number of synergistic processor elements (SPEs) 706. In the example depicted in FIG. 7, the cell processor 700 includes a single PPE 704 and eight SPE 706. In such a configuration, seven of the SPE 706 may be used for parallel processing and one may be reserved as a back-up in case one of the other seven fails. A cell processor may alternatively include multiple groups of PPEs (PPE groups) and multiple groups of SPEs (SPE groups). In such a case, hardware resources can be shared between units within a group. However, the SPEs and PPEs must appear to software as independent elements. As such, embodiments of the present invention are not limited to use with the configuration shown in FIG. 7.

The main memory 702 typically includes both general-purpose and nonvolatile storage, as well as special-purpose hardware registers or arrays used for functions such as system configuration, data-transfer synchronization, memory-mapped I/O, and I/O subsystems. In embodiments of the present invention, a video game program 703 and data 709 may be resident in main memory 702. The video program 703 may include inertial, image and acoustic analyzers and a mixer configured as described with respect to FIG. 4, 5A, 5B or 5C above or some combination of these. The program 703 may run on the PPE. The program 703 may be divided up into multiple signal processing tasks that can be executed on the SPEs and/or PPE.

By way of example, the PPE 704 may be a 64-bit PowerPC Processor Unit (PPU) with associated caches L1 and L2. The PPE 704 is a general-purpose processing unit, which can access system management resources (such as the memory-protection tables, for example). Hardware resources may be mapped explicitly to a real address space as seen by the PPE. Therefore, the PPE can address any of these resources directly by using an appropriate effective address value. A primary function of the PPE 704 is the management and allocation of tasks for the SPEs 706 in the cell processor 700.

Although only a single PPE is shown in FIG. 7, some cell processor implementations, such as cell broadband engine architecture (CBEA), the cell processor 700 may have multiple PPEs organized into PPE groups, of which there may be more than one. These PPE groups may share access to the main memory 702. Furthermore the cell processor 700 may include two or more groups SPEs. The SPE groups may also share access to the main memory 702. Such configurations are within the scope of the present invention.

Each SPE 706 is includes a synergistic processor unit (SPU) and its own local storage area LS. The local storage LS may include one or more separate areas of memory storage, each one associated with a specific SPU. Each SPU may be configured to only execute instructions (including data load and data store operations) from within its own associated local storage domain. In such a configuration, data transfers between the local storage LS and elsewhere in the system 700 may be performed by issuing direct memory access (DMA) commands from the memory flow controller (MFC) to transfer data to or from the local storage domain (of the individual SPE). The SPUs are less complex computational units than the PPE 704 in that they do not perform any system management functions. The SPU generally have a single instruction, multiple data (SIMD) capability and typically process data and initiate any required data transfers (subject to access properties set up by the PPE) in order to perform their allocated tasks. The purpose of the SPU is to enable applications that require a higher computational unit density and can effectively use the provided instruction set. A significant number of SPEs in a system managed by the PPE 704 allow for cost-effective processing over a wide range of applications.

Each SPE 706 may include a dedicated memory flow controller (MFC) that includes an associated memory management unit that can hold and process memory-protection and access-permission information. The MFC provides the primary method for data transfer, protection, and synchronization between main storage of the cell processor and the local storage of an SPE. An MFC command describes the transfer to be performed. Commands for transferring data are sometimes referred to as MFC direct memory access (DMA) commands (or MFC DMA commands).

Each MFC may support multiple DMA transfers at the same time and can maintain and process multiple MFC commands. Each MFC DMA data transfer command request may involve both a local storage address (LSA) and an effective address (EA). The local storage address may directly address only the local storage area of its associated SPE. The effective address may have a more general application, e.g., it may be able to reference main storage, including all the SPE local storage areas, if they are aliased into the real address space.

To facilitate communication between the SPEs 706 and/or between the SPEs 706 and the PPE 704, the SPEs 706 and PPE 704 may include signal notification registers that are tied to signaling events. The PPE 704 and SPEs 706 may be coupled by a star topology in which the PPE 704 acts as a router to transmit messages to the SPEs 706. Alternatively, each SPE 706 and the PPE 704 may have a one-way signal notification register referred to as a mailbox. The mailbox can be used by an SPE 706 to host operating system (OS) synchronization.

The cell processor 700 may include an input/output (I/O) function 708 through which the cell processor 700 may interface with peripheral devices, such as a microphone array 712 and optional image capture unit 713 and a game controller 730. The game controller unit may include an inertial sensor 732, and light sources 734. In addition an Element Interconnect Bus 710 may connect the various components listed above. Each SPE and the PPE can access the bus 710 through a bus interface units BIU. The cell processor 700 may also includes two controllers typically found in a processor: a Memory Interface Controller MIC that controls the flow of data between the bus 710 and the main memory 702, and a Bus Interface Controller BIC, which controls the flow of data between the I/O 708 and the bus 710. Although the requirements for the MIC, BIC, BIUs and bus 710 may vary widely for different implementations, those of skill in the art will be familiar their functions and circuits for implementing them.

The cell processor 700 may also include an internal interrupt controller IIC. The IIC component manages the priority of the interrupts presented to the PPE. The IIC allows interrupts from the other components the cell processor 700 to be handled without using a main system interrupt controller. The IIC may be regarded as a second level controller. The main system interrupt controller may handle interrupts originating external to the cell processor.

In embodiments of the present invention, certain computations, such as the fractional delays described above, may be performed in parallel using the PPE 704 and/or one or more of the SPE 706. Each fractional delay calculation may be run as one or more separate tasks that different SPE 706 may take as they become available.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A system for analyzing game control input data, comprising:
   a first analyzer configured to receive and analyze input data from a first input device;
   a second analyzer configured to receive and analyze input data from a second input device,
   wherein the first and second input devices are two different types of input devices selected from the group of an image capture device, an acoustic receiver, and an inertial sensor;
   and
   a mixer configured to receive analyzed input data from the second analyzer and the first analyzer and generate tracking information based on information received from the first analyzer and/or the second analyzer and dynamically assign one or more distribution values to the information received by the mixer from the second analyzer and/or the first analyzer based on conditions in a game or conditions in an environment in which the first input device and the second input device operate, wherein each distribution value defines a weight to apply to a tracking information parameter from an input channel associated with one of the second analyzer and the first analyzer when mixing that parameter with the same parameter from an input channel associated with a different one of the second analyzer and the first analyzer, and wherein the mixer is configured to dynamically assign the one or more distribution values to the parameters and mix the resulting weighted parameter values for each input channel to produce a refined parameter value, wherein the mixer is configured to assign the distribution value based on whether input data for one or more of the input devices is in a desired range.

2. The system of claim 1, further comprising a gesture recognizer, the gesture recognizer configured to associate at least one action in a game environment with one or more user actions based on the tracking information.

3. The system of claim 1, further comprising a game controller, wherein the game controller includes at least one inertial sensor operable coupled to an inertial analyzer and/or one or more light sources configured to provide one or more light signals and/or one or more acoustic signal generators.

4. The system of claim 3 wherein the at least one inertial sensor includes at least one of an accelerometer or a gyroscope.

5. The system of claim 1, further comprising an image capture unit coupled to the image analyzer.

6. The system of claim 5, wherein the image capture device includes a camera.

7. The system of claim 1 wherein the tracking information includes position and/or orientation information of a user-manipulable object.

8. The system of claim 7 wherein the position and/or orientation information includes information indicative of at least one of pitch, yaw and roll of the user-manipulable object.

9. The system of claim 7 wherein the position and/or orientation information includes information indicative of a position with respect to one or more coordinates.

10. The system of claim 7 wherein the position and/or orientation information includes information indicative of a velocity with respect to one or more coordinates.

11. The system of claim 7 wherein the position and/or orientation information includes information indicative of an acceleration with respect to one or more coordinates.

12. The system of claim 7 wherein the user manipulable object is a controller for a video game system.

13. A method for analyzing game control input data, comprising:
   receiving input control data from a first analyzer configured to receive and analyze input data from a first input device and a second analyzer configured to receive and analyze input data from a second input device, wherein the input data is associated with one or more user actions, wherein the first and second input devices are two different types of input devices selected from the group of an image capture device, an acoustic receiver, and an inertial sensor;
   dynamically assigning first and second distribution values to the input control data received from the first analyzer and the second analyzer, respectively, wherein each distribution value defines a weight to apply to a tracking information parameter from an input channel associated with corresponding one of the second analyzer and the first analyzer when mixing that parameter with the same parameter from an input channel associated with a different one of the second analyzer and the first analyzer; and wherein the distribution values are assigned based on whether input data for one or more of the input devices is in a desired range;

identifying at least one action in a game environment associated with the one or more user actions based on the distribution value assigned to the received input data; and executing the at least one action in the game environment.

14. A non-transitory machine-readable storage medium having embodied thereon instructions for analyzing game control input data, the instructions comprising:

receiving input control data from a first analyzer configured to receive and analyze input data from a first input device and a second analyzer configured to receive and analyze input data from a second input device, wherein, the input control data is associated with one or more user actions, wherein the first and second input devices are two different types of input devices selected from the group of an image capture device, an acoustic receiver, and an inertial sensor;

dynamically assigning first and second distribution values to the input control data received from the first analyzer and the second analyzer, respectively, wherein each distribution value defines a weight to apply to a tracking information parameter from an input channel associated with a corresponding one of the second analyzer and the first analyzer when mixing that parameter with the same parameter from an input channel associated with a different one of the second analyzer and the first analyzer; and wherein the distribution values are assigned based on whether input data for one or more of the input devices is in a desired range;

identifying at least one action in a game environment associated with the one or more user actions based on the distribution value assigned to the received input control data;

and executing the at least one action in the game environment.

* * * * *